United States Patent
Inoue

(10) Patent No.: US 12,205,406 B2
(45) Date of Patent: Jan. 21, 2025

(54) INFORMATION PROCESSING DEVICE, INFORMATION PROCESSING SYSTEM, INFORMATION PROCESSING METHOD, AND STORAGE MEDIUM

(71) Applicant: NEC Corporation, Tokyo (JP)

(72) Inventor: Akira Inoue, Tokyo (JP)

(73) Assignee: NEC CORPORATION, Tokyo (JP)

(*) Notice: Subject to any disclaimer, the term of this patent is extended or adjusted under 35 U.S.C. 154(b) by 252 days.

(21) Appl. No.: 17/436,220

(22) PCT Filed: Mar. 14, 2019

(86) PCT No.: PCT/JP2019/010697
§ 371 (c)(1),
(2) Date: Sep. 3, 2021

(87) PCT Pub. No.: WO2020/183732
PCT Pub. Date: Sep. 17, 2020

(65) Prior Publication Data
US 2022/0130173 A1  Apr. 28, 2022

(51) Int. Cl.
*G06V 40/19* (2022.01)
*G06T 7/73* (2017.01)
(Continued)

(52) U.S. Cl.
CPC ............... *G06V 40/19* (2022.01); *G06T 7/73* (2017.01); *G06V 40/172* (2022.01); *G06V 40/197* (2022.01); *G06T 2207/30201* (2013.01)

(58) Field of Classification Search
CPC ... G06T 1/00; G06T 2207/30201; G06T 7/00; G06T 7/73; G06V 40/172; G06V 40/19; G06V 40/197; H04N 23/611; H04N 23/64
See application file for complete search history.

(56) References Cited

U.S. PATENT DOCUMENTS

| 6,700,998 B1 * | 3/2004 | Murata | ............... G06V 40/18 382/117 |
| 9,256,720 B2 | 2/2016 | Berini et al. | |

(Continued)

FOREIGN PATENT DOCUMENTS

| CN | 107578041 A | 1/2018 |
| CN | 108710833 A | 10/2018 |

(Continued)

OTHER PUBLICATIONS

International Search Report for PCT Application No. PCT/JP2019/010697, mailed on May 7, 2019.
(Continued)

*Primary Examiner* — Peter D Le

(57) ABSTRACT

An information processing device according to this disclosure is an information processing device that controls an iris recognition system, and the information processing device includes: an acquisition unit that acquires visual line information on a recognition target from an image captured by a first capture device; and a control unit that controls the iris recognition system so that a visual line direction obtained from the visual line information and a capturing direction of a second capture device, which captures an iris image used for iris recognition of the recognition target, face each other.

19 Claims, 16 Drawing Sheets

(51) Int. Cl.
*G06V 40/16* (2022.01)
*G06V 40/18* (2022.01)

(56) References Cited

U.S. PATENT DOCUMENTS

| | | | | |
|---|---|---|---|---|
| 10,698,481 | B1* | 6/2020 | Najafi Shoushtari | ........................ G06T 19/006 |
| 10,825,245 | B1* | 11/2020 | Ramasamy | ............ G06V 40/19 |
| 2001/0009478 | A1* | 7/2001 | Yamazaki | .......... G02B 27/0172 359/632 |
| 2003/0081817 | A1* | 5/2003 | Nakaigawa | ............ G06V 40/67 348/78 |
| 2004/0230480 | A1* | 11/2004 | Kanayama | ............. G06Q 20/32 705/13 |
| 2005/0270386 | A1* | 12/2005 | Saitoh | .................... G06V 40/19 348/239 |
| 2007/0014552 | A1* | 1/2007 | Ebisawa | ................. A61B 3/113 396/51 |
| 2007/0263908 | A1 | 11/2007 | Tsukahara | |
| 2007/0279590 | A1* | 12/2007 | Ebisawa | ................. A61B 3/113 351/208 |
| 2008/0297586 | A1* | 12/2008 | Kurtz | .................. H04L 12/1827 348/E7.083 |
| 2010/0238263 | A1* | 9/2010 | Robinson | ............... H04N 7/144 348/14.08 |
| 2011/0058019 | A1* | 3/2011 | Onozawa | ............. H04N 13/398 348/E13.001 |
| 2011/0187844 | A1* | 8/2011 | Ogawa | ................... G02B 27/01 348/78 |
| 2011/0249868 | A1* | 10/2011 | Tsukizawa | ............. A61B 5/163 382/103 |
| 2011/0261320 | A1* | 10/2011 | Hacker | ................... A61B 3/152 351/210 |
| 2012/0033853 | A1* | 2/2012 | Kaneda | ................... G06V 40/16 382/103 |
| 2012/0154441 | A1* | 6/2012 | Kim | .................... G08G 1/09623 345/633 |
| 2013/0060365 | A1* | 3/2013 | Jeong | .................... G10L 19/028 700/94 |
| 2014/0160249 | A1* | 6/2014 | Ro | ........................... G06T 7/593 348/47 |
| 2015/0146028 | A1* | 5/2015 | Choi | ....................... H04N 23/90 348/211.11 |
| 2015/0199812 | A1* | 7/2015 | Hakoshima | ......... A61B 17/0644 348/78 |
| 2015/0238087 | A1* | 8/2015 | Yamashita | ........... A61B 5/7275 600/476 |
| 2015/0346814 | A1* | 12/2015 | Thukral | .................... H04N 7/18 345/156 |
| 2015/0374223 | A1* | 12/2015 | Shudo | .................... A61B 5/163 351/210 |
| 2016/0124506 | A1* | 5/2016 | Hwang | ................... G06F 3/017 345/156 |
| 2016/0202757 | A1* | 7/2016 | Miao | .................... H04N 23/611 348/78 |
| 2016/0291330 | A1* | 10/2016 | Kurokawa | ............. G02B 27/01 |
| 2017/0070680 | A1* | 3/2017 | Kobayashi | ............. H04N 23/11 |
| 2018/0356246 | A1* | 12/2018 | Uchide | ..................... G06T 7/70 |
| 2019/0282091 | A1 | 9/2019 | Matsunobu | |
| 2022/0031158 | A1* | 2/2022 | Keita | ....................... A61B 3/14 |

FOREIGN PATENT DOCUMENTS

| | | |
|---|---|---|
| JP | H10-40386 A | 2/1998 |
| JP | 2000-011163 A | 1/2000 |
| JP | 2003-327009 A | 11/2003 |
| JP | 2006-136450 A | 6/2006 |
| JP | 2007-006427 A | 1/2007 |
| JP | 2007-011667 A | 1/2007 |
| JP | 2007-257040 A | 10/2007 |
| JP | 2008-197713 A | 8/2008 |
| JP | 2010-151951 A | 7/2010 |
| JP | 2010-267121 A | 11/2010 |
| JP | 2011-113196 A | 6/2011 |
| JP | 2012-216180 A | 11/2012 |
| JP | 2017-208638 A | 11/2017 |
| WO | 2007/004498 A1 | 1/2007 |
| WO | 2009/016846 A1 | 2/2009 |
| WO | 2018/105512 A1 | 6/2018 |

OTHER PUBLICATIONS

English translation of Written opinion for PCT Application No. PCT/JP2019/010697, mailed on May 7, 2019.
Japanese Office Action for JP Application No. 2021-505476, mailed on Oct. 18, 2022 with English Translation.
Taiwanese Office Action for TW Application No. 109107229 mailed on Aug. 17, 2022 with English Translation.

* cited by examiner

INFORMATION PROCESSING DEVICE, INFORMATION PROCESSING SYSTEM, INFORMATION PROCESSING METHOD, AND STORAGE MEDIUM

This application is a National Stage Entry of PCT/JP2019/010697 filed on Mar. 14, 2019, the contents of all of which are incorporated herein by reference, in their entirety.

TECHNICAL FIELD

This disclosure relates to an information processing device, an information processing system, an information processing method, and a storage medium.

BACKGROUND ART

Patent Literature 1 discloses a system that captures an iris image of a user by using a near-infrared camera and authenticates the user based on a similarity between an iris code generated from the iris image and a registered iris code of a registrant.

CITATION LIST

Patent Literature

PTL 1: Japanese Patent Application Laid-Open No. 2008-197713

SUMMARY OF INVENTION

Technical Problem

The system illustrated as an example in Patent Literature 1 assumes that the user helps itself to perform positioning of the eye relative to a near-infrared camera and an iris image is captured with the user standing still. Thus, there is room for improvement in terms of user convenience.

Accordingly, in view of the problem described above, this disclosure intends to provide an information processing device, an information processing system, an information processing method, and a storage medium that can improve user convenience in iris authentication.

Solution to Problem

According to one example aspect of this disclosure, provided is an information processing device that controls an iris recognition system, the information processing device including: an acquisition unit that acquires visual line information on a recognition target from an image captured by a first capture device; and a control unit that controls the iris recognition system so that a visual line direction obtained from the visual line information and a capturing direction of a second capture device, which captures an iris image used for iris recognition of the recognition target, face each other.

According to another example aspect of this disclosure, provided is an information processing system including: a first capture device that captures a first image including at least a part of a face of a recognition target; a second capture device that captures a second image including an iris of the recognition target; and an information processing device, and the information processing device includes an acquisition unit that acquires visual line information on the recognition target based on the first image and a control unit that controls the information processing system so that a visual line direction of the recognition target obtained from the visual line information and a capturing direction of the second capture device face each other.

According to yet another example aspect of this disclosure, provided is an information processing method for controlling an iris recognition system, and the information processing method includes: acquiring visual line information on a recognition target from an image captured by a first capture device; and controlling the iris recognition system so that a visual line direction obtained from the visual line information and a capturing direction of a second capture device, which captures an iris image used for iris recognition of the recognition target, face each other.

According to yet another example aspect of this disclosure, provided is a storage medium storing a program that causes a computer that controls an iris recognition system to perform: acquiring visual line information on a recognition target from an image captured by a first capture device; and controlling the iris recognition system so that a visual line direction obtained from the visual line information and a capturing direction of a second capture device, which captures an iris image used for iris recognition of the recognition target, face each other.

Advantageous Effects of Invention

According to this disclosure, it is possible to provide an information processing device, an information processing system, an information processing method, and a storage medium that can improve user convenience in iris authentication.

DESCRIPTION OF EMBODIMENTS

Exemplary example embodiments of this disclosure will be described below with reference to the drawings. Throughout the drawings, the same or corresponding elements are labeled with the same reference, and the description thereof may be omitted or simplified.

First Example Embodiment

Figure 1:
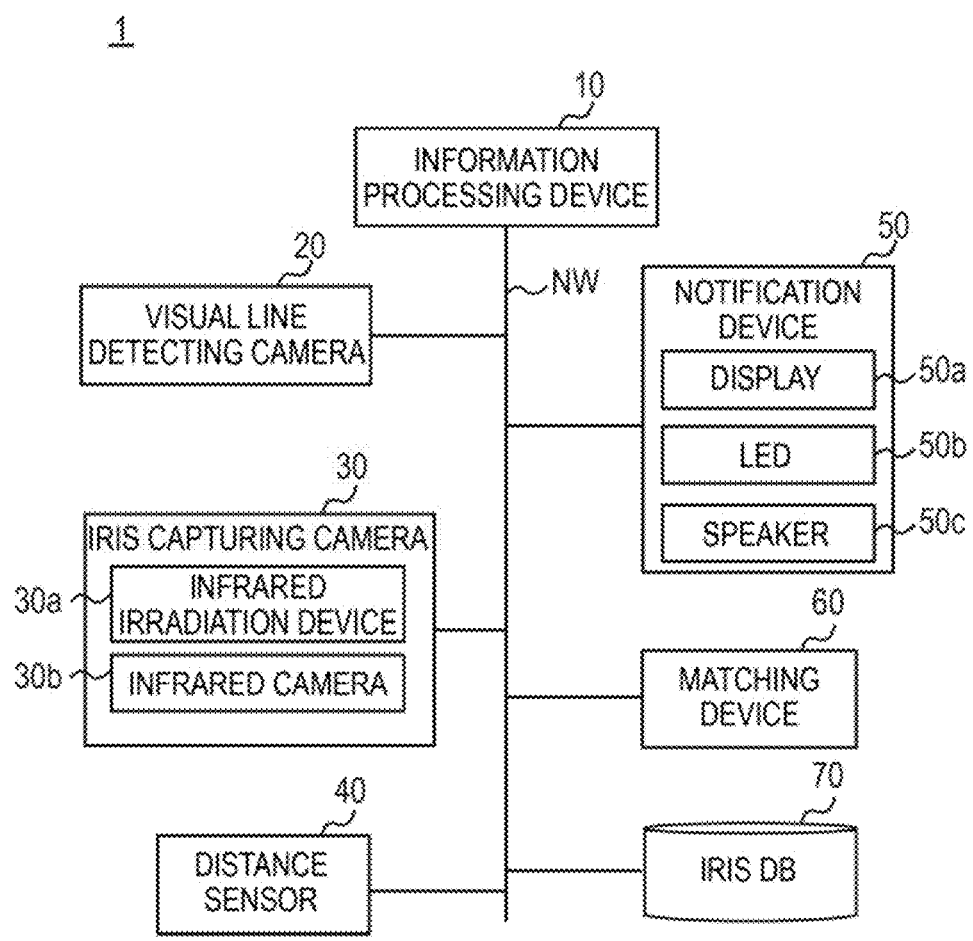
FIG. 1 is a diagram illustrating an example of an overall configuration of an iris recognition system in a first example embodiment.

FIG. 1 is a diagram illustrating an example of the overall configuration of an iris recognition system in the present example embodiment. The iris recognition system 1 has a function of iris recognition that is one type of biometrics recognition. The iris recognition system 1 captures an iris of a user that is a recognition target and performs iris recognition by matching the captured iris image with a registered iris image. A pattern of an iris is unique and permanent. Thus, it is possible to perform identity verification by matching an iris pattern acquired at the time of recognition with an iris image preregistered in a database.

The iris recognition system 1 in the present example embodiment may be applied to, for example, identity verification for entry to or departure from a country at an airport, a seaport, or a national border, identity verification at a government office, identity verification for entry to or exit from a factory or an office, identity verification at the time of entry to an event site, or the like.

As illustrated in FIG. 1, the iris recognition system 1 includes an information processing device 10, a visual line detecting camera 20, an iris capturing camera 30, a distance sensor 40, a notification device 50, a matching device 60, and an iris database 70. Each device is connected to a network NW such as a Local Area Network (LAN), the Internet, or the like.

The information processing device 10 is a control device forming the core of the iris recognition system 1. The information processing device 10 may be a server computer, for example. The information processing device 10 acquires visual line information on a recognition target based on an image of the recognition target received from the visual line detecting camera 20. The information processing device 10 controls component devices of the iris recognition system 1 so that a visual line direction obtained from visual line information and a capturing direction of a capture device, which captures an iris image used for iris recognition of a recognition target, face each other.

Further, when the angle is a value which satisfies a predetermined determination criterion (tolerance angle range), the information processing device 10 controls the iris capturing camera 30 to capture an iris image of a recognition target. The information processing device 10 then controls the matching device 60 to match the captured iris image of the recognition target with an iris image of a registrant pre-stored in the iris database 70. In contrast, when the angle is a value which does not satisfy the predetermined determination criterion (tolerance range), the information processing device 10 controls the notification device 50 to call for attention to the recognition target to direct the visual line direction of a recognition target to the iris capturing camera 30 side. That is, the information processing device 10 of the present example embodiment controls the notification device 50 so as to reduce the angle of a visual line direction of a recognition target relative to a capturing direction of a capture device.

The visual line detecting camera 20 is a capture device (first capture device) that can capture a face, an eye, or the like of a recognition target with a visible light and acquire an image. The visual line detecting camera 20 captures a first image including at least a part of a face of a recognition target. For the visual line detecting camera 20, a digital camera using a Complementary Metal Oxide Semiconductor (CMOS) image sensor, a Charge Coupled Device (CCD) image sensor, or the like may be used so as to provide suitable image processing after capturing. Note that the visual line detecting camera 20 may have a light source that emits an illumination light to a recognition target.

The iris capturing camera 30 is a capture device (second capture device) formed of an infrared irradiation device 30a and an infrared camera 30b and captures a second image including an iris of a recognition target. The infrared irradiation device 30a includes a light-emitting element that emits an infrared light, such as an infrared LED. The capturing wavelength of the iris capturing camera 30 is different from the capturing wavelength of the visual line detecting camera 20. Specifically, the wavelength of an infrared ray emitted from the infrared irradiation device 30a may be within a near-infrared region around 800 nm, for example.

For the infrared camera 30b, a digital camera using a CMOS image sensor, a CCD image sensor, or the like having a light-receiving element configured to have sensitivity to an infrared ray may be used. It is possible to capture an iris image used for iris recognition by irradiating an eye of a recognition target with an infrared light from the infrared irradiation device 30a and capturing an infrared ray reflected by an iris by using the infrared camera 30b. When an iris image is acquired by using an infrared ray, a high contrast image can be obtained regardless of the color of the iris, and influence of reflection by a cornea can be reduced. Note that, in the present example embodiment, the resolution of the second image is higher than the resolution of the first image.

The distance sensor 40 emits a light such as an infrared ray to an object, detects the distance based on time required for the emitted light to travel back and forth between the distance sensor 40 and the object, and outputs a signal indicating the detected distance to the information processing device 10.

The notification device 50 is a device that calls for attention to a recognition target to direct the visual line direction to the iris capturing camera 30 side based on notification control information from the information processing device 10. The notification device 50 includes at least one of a display 50a, an LED 50b, and a speaker 50c. The notification control information in the present example embodiment includes information used for guiding a visual line direction of a recognition target to the iris capturing camera 30 side. For example, the display 50a, the LED 50b, and the speaker 50c performs the following notification based on the notification control information.

The display 50a displays a text message or an image in a display region and thereby notifies the recognition target of whether or not the angle of the visual line direction of the recognition target relative to the capturing direction of the iris capturing camera 30 satisfies a predetermined determination criterion. For example, on the display 50a, it is possible to provide a notification of "OK" when the color of the screen is green, "be careful" when the color is yellow, and "need to correct" when the color is red.

The LED 50b switches turning on/off of lighting or switches colors of lighting and thereby notifies the recognition target of whether or not the angle of the visual line direction of the recognition target relative to the capturing direction of the iris capturing camera 30 satisfies a predetermined determination criterion. For example, with the LED 50b, it is possible to provide a notification of "OK" when the color of lighting is green, "be careful" when the color is yellow, and "need to correct" when the color is red.

The speaker 50c outputs an alarm sound or a guidance voice and thereby notifies the recognition target of whether or not the angle of the visual line direction of the recognition target relative to the capturing direction of the iris capturing camera 30 satisfies a predetermined determination criterion. For example, a guidance voice such as "please look at the lamp-ON camera" or "please shift slightly your eyes to the right" may be output.

The matching device 60 performs a matching process of an iris image (alternatively, a feature amount) captured by the iris capturing camera 30 with a registered iris image (alternatively, a feature amount) registered in the iris database 70 based on control information from the information processing device 10 and authenticates a recognition target.

The iris database 70 is a database that stores an image of an eye of a registrant that is a target for matching, an iris image detected from the image of the eye, a feature amount of the iris calculated from the iris image, or the like in association with an ID of the registrant. Note that the matching device 60 and the iris database 70 may be configured as a device integrated with the information processing device 10.

Figure 2:
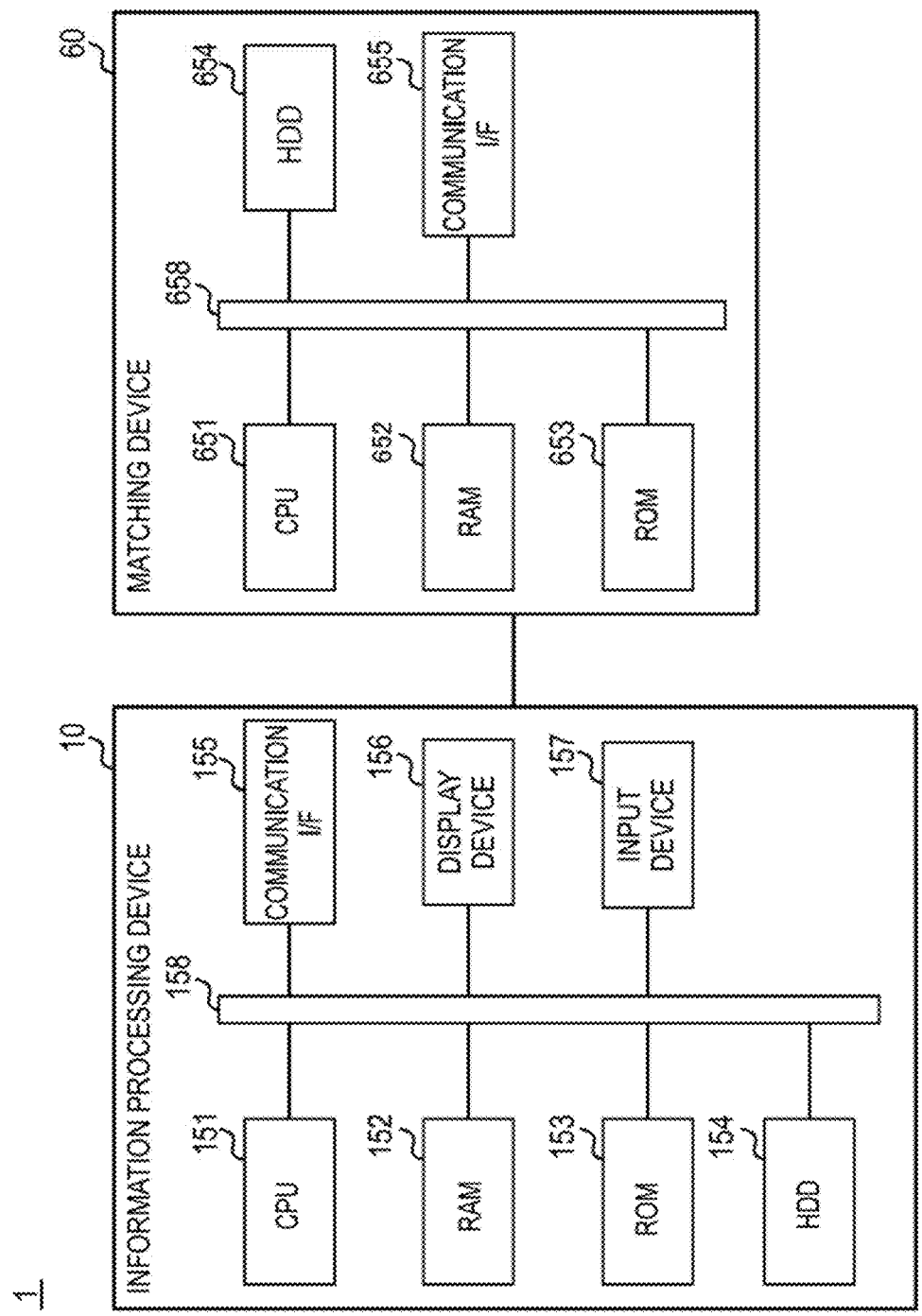
FIG. 2 is a block diagram illustrating a hardware configuration of an information processing device and a matching device in the first example embodiment.

FIG. 2 is a block diagram illustrating an example of the hardware configuration of the information processing device 10 and the matching device 60 in the present example embodiment. The information processing device 10 has a central processing unit (CPU) 151, a random access memory (RAM) 152, a read only memory (ROM) 153, a hard disk drive (HDD) 154, a communication interface (I/F) 155, a display device 156, and an input device 157 as a computer that performs operation, control, and storage. The CPU 151, the RAM 152, the ROM 153, and the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

The CPU 151 is a processor having a function of performing a predetermined operation in accordance with a program stored in the ROM 153, the HDD 154, or the like and controlling each component of the information processing device 10. The RAM 152 is formed of a volatile storage medium and provides a temporary memory area required for the operation of the CPU 151. The ROM 153 is formed of a nonvolatile storage medium and stores necessary information such as a program used for the operation of the information processing device 10. The HDD 154 is a storage device that is formed of a nonvolatile storage medium and stores data required for a process, a program for the operation of the information processing device 10, or the like.

The communication I/F 155 is a communication interface based on a standard such as Ethernet (registered trademark), Wi-Fi (registered trademark), 4G, or the like and is a module used for communicating with another device. The display device 156 is a liquid crystal display, an organic light emitting diode (OLED) display, or the like and is used for displaying a moving image, a static image, a text, or the like. The input device 157 is a keyboard, a pointing device, or the like and is used by a user to operate the information processing device 10. An example of the pointing device may be a mouse, a trackball, a touch panel, a pen-tablet, or the like. The display device 156 and the input device 157 may be formed integrally as a touch panel.

Similarly, the matching device 60 has a CPU 651, a RAM 652, a ROM 653, an HDD 654, and a communication I/F 655 as a computer that performs operation, control, and storage. Since these devices are the same as the CPU 151, the RAM 152, the ROM 153, the HDD 154, and the communication I/F 155 of the information processing device 10, detailed description thereof will be omitted. The CPU 651, the RAM 652, the ROM 653, and HDD 654, the communication I/F 655 are connected to each other via a bus 658.

Note that the hardware configuration illustrated in FIG. 2 is an example, a device other than the above may be added, or some of the devices may not be provided. Further, some of the devices may be replaced with another device having the same function. Furthermore, some of the functions of the present example embodiment may be provided by another device via the network NW, the functions of the present example embodiment may be distributed and implemented in a plurality of devices. For example, the HDD 154 may be replaced with a solid state drive (SSD) using a semiconductor memory or may be replaced with cloud storage.

Figure 3:
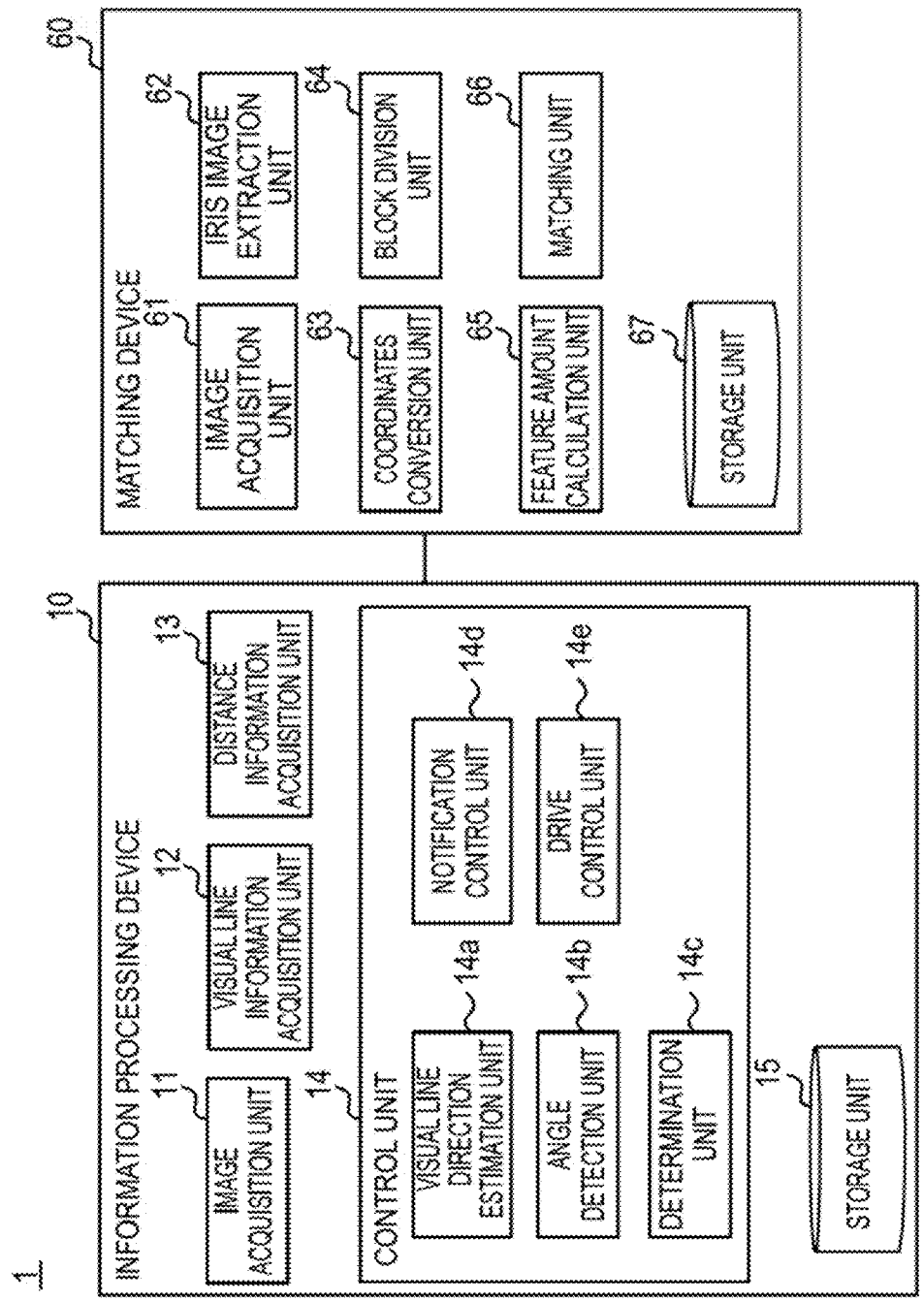
FIG. 3 is a block diagram illustrating functions of the information processing device and the matching device in the first example embodiment.

FIG. 3 is a block diagram illustrating the functions of the information processing device 10 and the matching device 60 in the present example embodiment. The information processing device 10 has an image acquisition unit 11, a visual line information acquisition unit 12, a distance information acquisition unit 13, a control unit 14, and a storage unit 15. The CPU 151 loads a program stored in the ROM 153, the HDD 154, or the like to the RAM 152 and executes the program. Thereby, the CPU 151 implements the functions of the image acquisition unit 11, the visual line information acquisition unit 12, the distance information acquisition unit 13, the control unit 14 (a visual line direction estimation unit 14*a*, an angle detection unit 14*b*, a determination unit 14*c*, a notification control unit 14*d*, and a drive control unit 14*e*), or the like. Details of the process performed in each of these units will be described later. Furthermore, the CPU 151 controls the HDD 154 to implement the function of the storage unit 15. The storage unit 15 stores data such as an image acquired by the image acquisition unit 11, a determination criterion of a visual line direction, visual line information acquired from a face image, or the like.

On the other hand, the matching device 60 has an image acquisition unit 61, an iris image extraction unit 62, a coordinate conversion unit 63, a block division unit 64, a feature amount calculation unit 65, a matching unit 66, and a storage unit 67. The CPU 651 loads a program stored in the ROM 653 or the like to the RAM 652 and executes the program. Thereby, the CPU 651 implements the functions of the image acquisition unit 61, the iris image extraction unit 62, the coordinate conversion unit 63, the block division unit 64, the feature amount calculation unit 65, and the matching unit 66. Details of the process performed in each of these units will be described later. Furthermore, the CPU 651 controls the HDD 654 to implement the function of the storage unit 67. The storage unit 67 stores data such as an image of an eye acquired by the image acquisition unit 61, an iris image extracted from the image of the eye, a feature amount calculated from the iris image, or the like.

Figure 4:
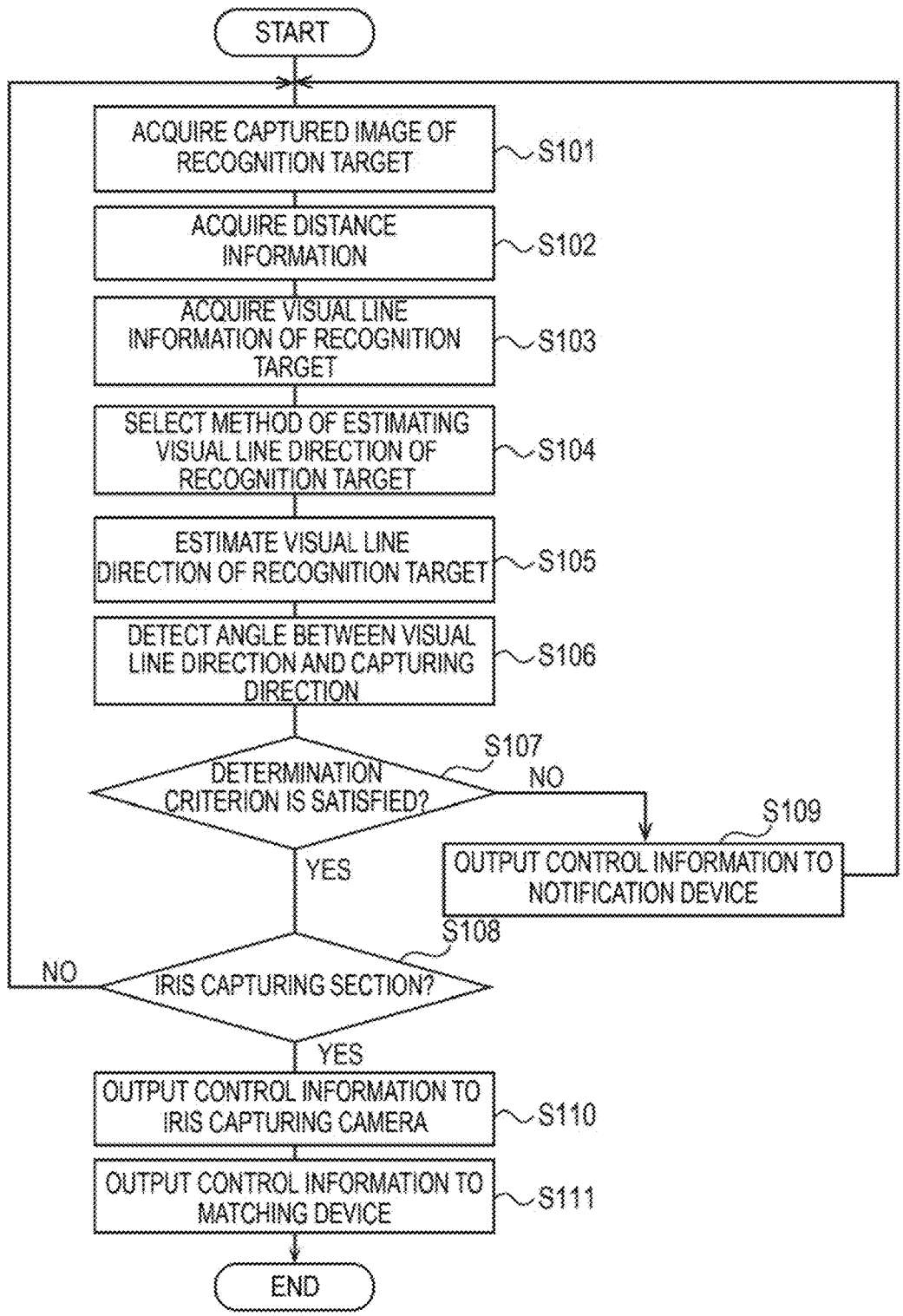
FIG. 4 is a flowchart illustrating one example of a process in the information processing device in the first example embodiment.

Next, the operation of each device of the iris recognition system 1 configured as described above will be described. FIG. 4 is a flowchart illustrating one example of a control process of the information processing device 10 in the present example embodiment. Note that the process of FIG. 4 is an example, and order in the process may be changed as appropriate.

First, the image acquisition unit 11 receives a captured image captured by the visual line detecting camera 20 (step S101). Note that the captured image is used for estimation of a visual line direction and thus includes at least a part of a face of a recognition target.

Next, the distance information acquisition unit 13 receives, from the distance sensor 40, a signal indicating the distance between the recognition target and the iris capturing camera 30 as distance information (step S102).

Next, the visual line information acquisition unit 12 analyzes the captured image received in step S101 and acquires visual line information on a recognition target (step S103). Note that the visual line information in the present example embodiment may include a face orientation of a recognition target, position information on an eye region within an image, position information on an outer canthus, a pupil, and an iris, or the like.

Next, the control unit 14 (the visual line direction estimation unit 14*a*) selects a method of estimating a visual line direction of the recognition target based on the distance between the recognition target and the iris capturing camera 30 (step S104). In the present example embodiment, two types of methods can be selected as a method of estimating the visual line direction. Specifically, the control unit 14 (the visual line direction estimation unit 14*a*) estimates a visual line direction based on the face orientation of a recognition target included in visual line information when the distance is greater than or equal to a predetermined reference distance (first method). Alternatively, the control unit 14 (the visual line direction estimation unit 14*a*) estimates a visual line direction based on the position information on a pupil or an iris of a recognition target included in visual line information when the distance is less than a reference distance (second method).

The first method is as below, for example. First, the visual line information acquisition unit 12 extracts the face orientation from a face region extracted from a face image by using any method. The visual line information acquisition unit 12 acquires the positions of both the eyes (pupils) and the position of the nose by using template matching from a face region extracted from a face image. Next, the visual line information acquisition unit 12 defines, as a center line of the face, a line from the intermediate point between the positions of both the eyes to the position of the nose and calculates a ratio between the distance from the center line to the left end of the face region and the distance from the center line to the right end of the face region. The visual line information acquisition unit 12 then calculates the face orientation in the lateral direction by using a lateral ratio in the face region based on a table indicating a relationship between a pre-stored lateral ratio and a face orientation. The table indicating a relationship between a lateral ratio and a face orientation is determined by an experiment or a simulation in advance and held in a storage area.

Similarly, the visual line information acquisition unit 12 calculates the face orientation in the vertical direction by using positions of face components. For example, a line between positions of both the eyes is defined as a horizontal line of the face, and a ratio between the distance from the horizontal line to the upper end of the face region and the distance from the horizontal line to the lower end of the face region is calculated. The visual line direction estimation unit 14*a* then calculates the face orientation in the vertical direction by using the vertical ratio in the face region based on a table indicating a relationship between a pre-stored vertical ratio and a face orientation. The face orientation is represented by three angles of a pan angle, a tilt angle, and a roll angle, for example. The visual line information acquisition unit 12 holds the detected face orientation in a storage area as visual line information. When the distance is greater than or equal to a predetermined reference distance, the control unit 14 (the visual line direction estimation unit 14*a*) then calculates (estimates) the visual line direction based on the face orientation of the recognition target included in the visual line information.

Figure 5:
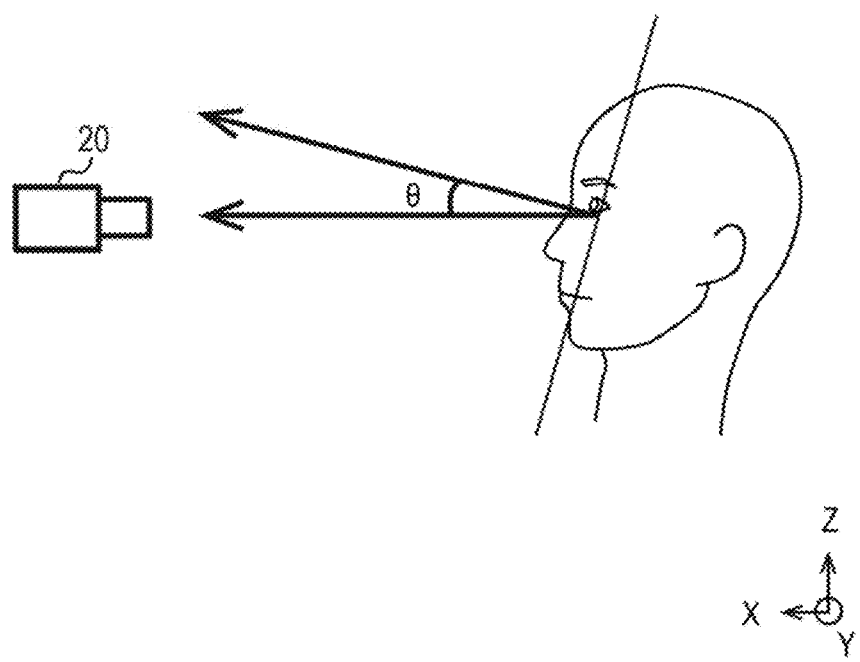
FIG. 5 is a diagram illustrating a method of estimating a visual line direction of a recognition target in the first example embodiment.

FIG. 5 illustrates a case of estimating a visual line direction based on the face orientation of a recognition target. Herein, FIG. 5 illustrates a case where the face orientation of a recognition target is directed upward by an angle $\theta$ when the visual line detecting camera 20 is present in the front direction (X-axis direction in FIG. 5) of the recognition target. This method detects the degree by which the face is inclined and estimates the visual line direction from the face orientation based on a state as a reference where a recognition target stands upright and faces the front straight.

However, the face orientation and the visual line direction of a recognition target are not necessarily the same. Thus, it is preferable to apply the method of estimating a visual line direction based on the face orientation of a recognition target when a recognition target is located not within an iris capturing section but within a section distant from a camera (for example, near the entrance of a visual line adjustment section) and allow the recognition target to prepare for capturing.

The second method is as below, for example. First, the visual line information acquisition unit 12 acquires the positions of pupils of both the eyes as visual line information by using template matching from a face region extracted from a face image, for example. Next, the control unit 14 (the visual line direction estimation unit 14a) calculates the visual line direction based on relative positions of pupils from a predetermined reference point on a person's face for both the eyes, respectively. The predetermined reference point may be, for example, the position of a Purkinje image that is a reflection point of a light on a cornea, the position of an inner canthus, or the like.

The control unit 14 (the visual line direction estimation unit 14a) then calculates a visual line direction by using a relative position of a pupil to a predetermined reference point in the face region based on a table indicating a relationship between a relative position of a pupil to a pre-stored predetermined reference point and a visual line direction.

The table indicating a relationship between a relative position of a pupil and a visual line direction is determined by an experiment or a simulation in advance and held in a storage area. A visual line direction is represented by two angles of an azimuth angle and an elevation angle, for example, for both the eyes, respectively. A visual line direction may be represented by an average value of visual line directions of both the eyes. The visual line direction estimation unit 14a holds the calculated visual line direction in a storage area.

Figure 6A:
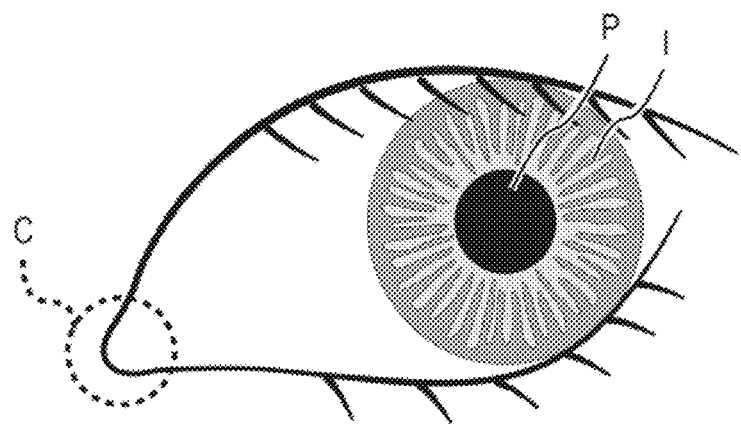
FIG. 6A is a diagram illustrating the method of estimating a visual line direction of the recognition target in the first example embodiment.
Figure 6B:
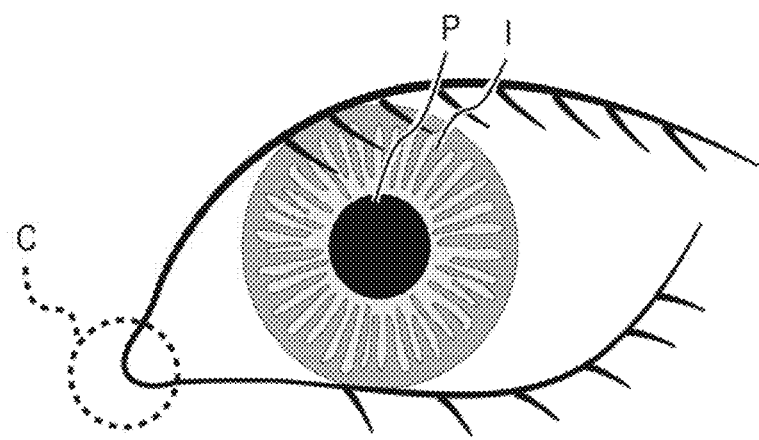
FIG. 6B is a diagram illustrating the method of estimating a visual line direction of the recognition target in the first example embodiment.

FIG. 6A and FIG. 6B illustrate a case of estimating a visual line direction of a recognition target based on a positional relationship between an inner canthus C and an iris I where the inner canthus C is defined as a reference point and the iris I is defined as a moving point for an eye image of a recognition target. In FIG. 6A, the iris I is distant from the inner canthus C in the left eye of the recognition target. In such a case, it is estimated that the recognition target is looking at the outer canthus side. In contrast, in FIG. 6B, the iris I is located on the inner canthus C side in the left eye of the recognition target. In such a case, it is estimated that the recognition target is looking at the inner canthus C side.

Figure 7A:
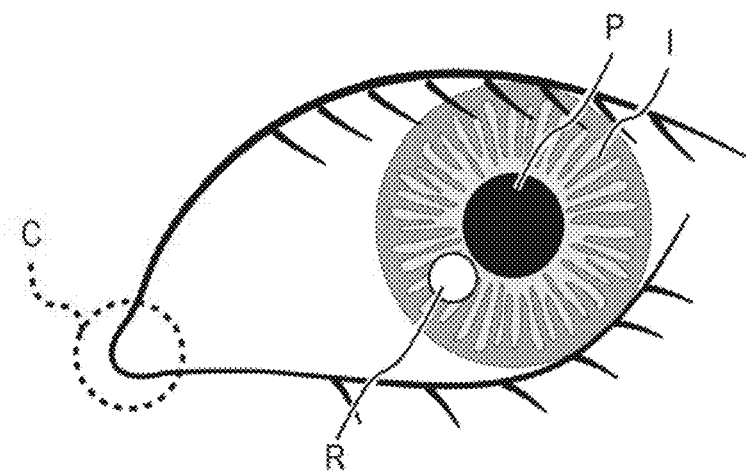
FIG. 7A is a diagram illustrating a method of estimating a visual line direction of the recognition target in the first example embodiment.
Figure 7B:
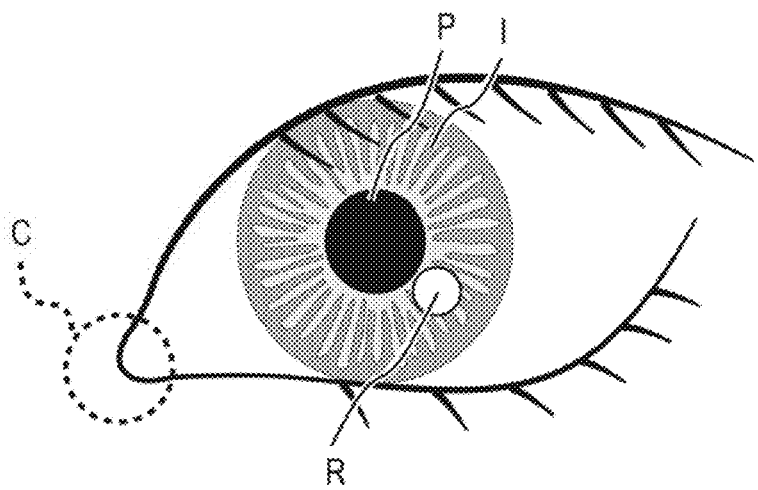
FIG. 7B is a diagram illustrating the method of estimating a visual line direction of the recognition target in the first example embodiment.

FIG. 7A and FIG. 7B illustrate a case where the visual line direction of a recognition target is estimated based on a positional relationship between a cornea reflection point R and a pupil P where the cornea reflection point R is defined as a reference point and the pupil P is defined as a moving point in an eye image of the recognition target when the face of the recognition target is irradiated with an irradiation light of an infrared LED or the like. In FIG. 7A, the pupil P is located on the outer canthus side of the cornea reflection point R in the left eye of the recognition target. In such a case, it is estimated that the recognition target is looking at the outer canthus side. In contrast, in FIG. 7B, the pupil P is located on the inner canthus C side of the cornea reflection point R in the left eye of the recognition target. In such a case, it is estimated that the recognition target is looking at the inner canthus C side.

A plurality of methods of estimating a visual line direction have been described with FIG. 5, FIG. 6A, FIG. 6B, FIG. 7A, and FIG. 7B, and it is preferable to select any of the methods by comprehensively taking the distance between a recognition target and a camera or an installation cost into account. For example, the estimation method based on a face orientation illustrated in FIG. 5 is useful when the distance to the recognition target is long and the inside of the eye is unable to be captured at high resolution. In contrast, the estimation methods of FIG. 6A, FIG. 6B, FIG. 7A, and FIG. 7B have advantage of capability of estimation at higher accuracy than the estimation method of FIG. 5 and are useful in particular when the recognition target is present in a short distance. Furthermore, the estimation method illustrated in FIG. 6A and FIG. 6B can be implemented with only the visual line detecting camera 20 (visible light camera) and thus has an advantage of suppressed cost at implementation. The estimation method of FIG. 7A and FIG. 7B requires an infrared LED or the like as an additional light source but has an advantage of higher accuracy of estimation than the estimation method illustrated in FIG. 6A and FIG. 6B.

Next, the control unit 14 (the visual line direction estimation unit 14a) estimates the visual line direction of the recognition target from visual line information based on the selected estimation method (step S105).

Next, the control unit 14 (the angle detection unit 14b) detects the angle between the visual line direction estimated in step S105 and the capturing direction of the iris capturing camera 30 (hereafter, referred to as "detected angle") (step S106).

Next, the control unit 14 (the determination unit 14c) determines whether or not the detected angle satisfies a predetermined determination criterion (step S107). In this step, if the control unit 14 (the determination unit 14c) determines that the detected angle satisfies the predetermined determination criterion (step S107: YES), the process proceeds to step S108. On the other hand, if the control unit 14 (the determination unit 14c) determines that the detected angle does not satisfy the predetermined determination criterion (step S107: NO), the process proceeds to step S109.

Figure 8:
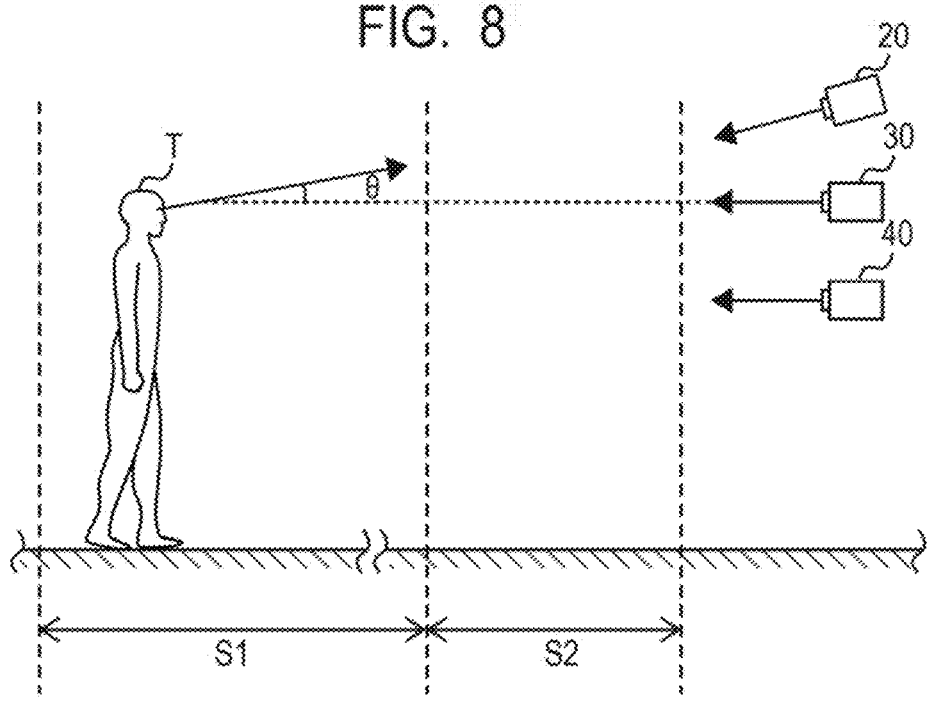
FIG. 8 is a diagram illustrating an angle of a visual line direction of the recognition target relative to a capturing direction of an iris capturing camera in the first example embodiment.
Figure 9:
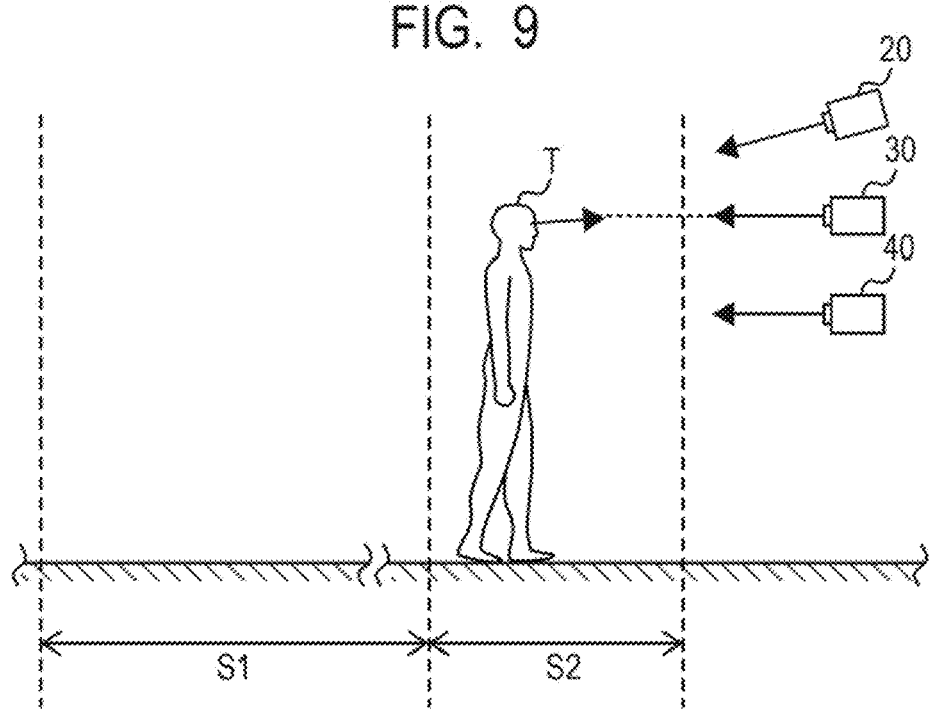
FIG. 9 is a diagram illustrating an angle of a visual line direction of the recognition target relative to a capturing direction of an iris capturing camera in the first example embodiment.

FIG. 8 and FIG. 9 are diagrams illustrating the angle of a visual line direction of a recognition target relative to a capturing direction of the iris capturing camera 30 in the present example embodiment. FIG. 8 illustrates that a recognition target T is present inside a visual line adjustment section S1 and the detected angle is θ. If the detected angle θ does not satisfy a predetermined determination criterion, the notification control unit 14d described above outputs control information to the notification device 50 to call for attention to the recognition target T to adjust the visual line direction within the visual line adjustment section S1.

In contrast, in FIG. 9, the recognition target T is present inside an iris capturing section S2 that is set closer to the iris capturing camera 30 than the visual line adjustment section S1. Further, it is illustrated that, since the visual line direction of the recognition target and the capturing direction of the iris capturing camera 30 are on substantially the same line, the detected angle θ (not illustrated) is sufficiently small. That is, the visual line direction is included within a predetermined range. In such a case, an eye portion of the recognition target will be included in the angle of view of the iris capturing camera 30. In response to receiving a result of determination performed by the determination unit 14c, the drive control unit 14e described above outputs control information in order to cause the iris capturing camera 30 to capture an iris image.

In step S108, the control unit 14 (the determination unit 14c) determines whether or not the recognition target is present inside the iris capturing section. In this step, if the control unit 14 (the determination unit 14c) determines that the recognition target is present inside the iris capturing section (step S108: YES), the process proceeds to step S110. On the other hand, if the control unit 14 (the determination unit 14c) determines that the recognition target is not present inside the iris capturing section (step S108: NO), the process returns to step S101.

In step S109, the control unit 14 (the notification control unit 14d) generates notification control information used for notifying the recognition target of various information based on the detected angle and controls the notification device 50, and the process then returns to step S101. That is, the control unit 14 (the notification control unit 14d) determines a notification method performed by the notification device 50 and calls for attention to the recognition target to direct the visual line direction to the iris capturing camera 30 side by using a notification method with screen display, a sound, a light, or the like at the notification device 50.

In step S110, the control unit 14 (the drive control unit 14e) outputs control information to the iris capturing camera 30. That is, the control unit 14 (the drive control unit 14e) causes the iris capturing camera 30 to capture an iris image when the angle is less than or equal to a predetermined angle and the distance is less than or equal to a predetermined distance.

The control unit 14 (the drive control unit 14e) then outputs control information to the matching device 60 (step S111), performs a matching process of the iris image captured by the iris capturing camera 30 with a registered iris image pre-registered in the iris database 70, and ends the process.

Figure 10:
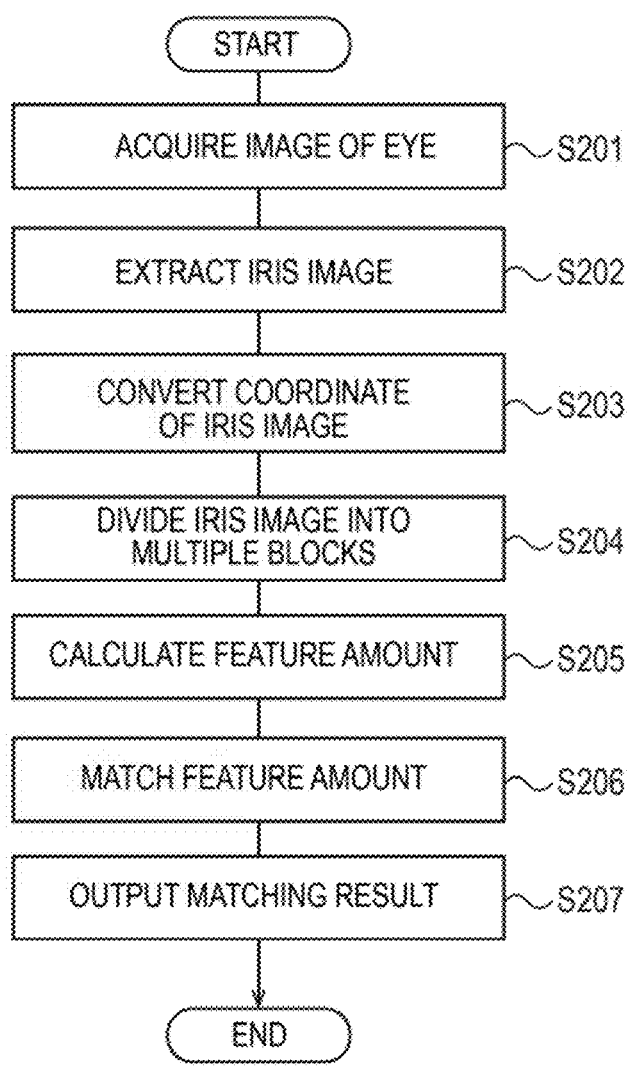
FIG. 10 is a flowchart illustrating one example of a process in a matching device in the first example embodiment.

FIG. 10 is a flowchart illustrating one example of the process in the matching device 60 in the present example embodiment. Further, FIGS. 11A to 11G are a schematic diagram illustrating the overview of the iris recognition process. The process of FIG. 10 is started when the matching device 60 receives control information from the information processing device 10.

In step S201, the image acquisition unit 61 acquires an image of an eye of a recognition target. This process corresponds to FIG. 11A. The acquired image is stored in the storage unit 67. Typically, this image is acquired by using an infrared ray and is a grayscale image.

In step S202, the iris image extraction unit 62 distinguishes an iris region from the image of the eye of the recognition target and extracts an iris image. This process corresponds to FIG. 11B and FIG. 11C.

One example of a method of distinguishing an iris region will be described. The iris image extraction unit 62 detects a pupil from the image of the eye and identifies the position thereof. The identified position of the pupil is stored in the storage unit 67. The shape of a pupil can be approximated as a circle. Thus, the position of a pupil can be expressed by the center coordinates and the radius of the pupil, for example. Note that it is possible to detect a region of a pupil by extracting pixels whose luminance is lower than a predetermined value, for example.

The iris image extraction unit 62 then detects an iris from the image of the eye and identifies the position of the iris. The identified position of the iris is stored in the storage unit 67. The shape of an iris can be approximated as an annular shape containing a pupil. Thus, the position of an iris can be expressed by the center coordinate, the outer radius, and the inner radius of the iris, for example. The inner radius of an iris corresponds to the radius of a pupil and thus may be omitted from information indicating the position of an iris. Note that it is possible to detect an iris by extracting a luminance change at the boundary between the outer circumference and a sclera (a so-called white of eye) of an iris, for example.

The iris image extraction unit 62 then extracts an iris image by cutting out the identified iris portion. The extracted iris image is stored in the storage unit 67.

Figure 11A:
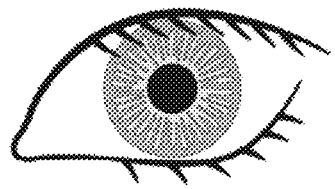
FIG. 11A is a schematic diagram illustrating an overview of an iris recognition process in the first example embodiment.
Figure 11B:
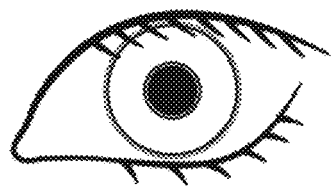
FIG. 11B is a schematic diagram illustrating an overview of the iris recognition process in the first example embodiment.
Figure 11C:
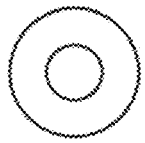
FIG. 11C is a schematic diagram illustrating an overview of the iris recognition process in the first example embodiment.
Figure 11D:
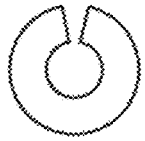
FIG. 11D is a schematic diagram illustrating an overview of the iris recognition process in the first example embodiment.
Figure 11E:
FIG. 11E is a schematic diagram illustrating an overview of the iris recognition process in the first example embodiment.

In step S203, the coordinate conversion unit 63 performs conversion of the iris image by converting coordinates. This process corresponds to FIG. 11D and FIG. 11E. As illustrated in FIG. 11D and FIG. 11E, the coordinate conversion unit 63 converts the annular iris image into a rectangular iris image. This process may be performed by converting the coordinate system of an iris image from the x-y plane coordinate system into the r-e polar coordinate system, for example. Since the shape of an iris image is simplified by such coordinate conversion, the process of feature amount calculation is simplified.

Figure 11F:
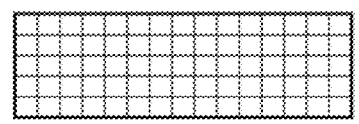
FIG. 11F is a schematic diagram illustrating an overview of the iris recognition process in the first example embodiment.

In step S204, the block division unit 64 divides the iris image converted into a rectangle into a plurality of blocks. This process corresponds to FIG. 11F. For example, the number of divisions may be 128 horizontally and 16 vertically (that is, in total 2048) or the like. Note that, although FIG. 11F represents that an iris image is cut and divided into multiple pieces for easier understanding, it is not essential to divide an image into multiple pieces. The process of step S204 may be a process of acquiring an association relationship between a luminance of each block and coordinates of each block of an iris image, for example.

In step S205, the feature amount calculation unit 65 performs a process of calculating a feature amount on the iris image divided into a plurality of blocks. This process corresponds to FIG. 11G. One example of a specific processing method of feature amount calculation will be described below.

The feature amount calculation unit 65 acquires a luminance of the iris image in each block. At this time, a feature amount code of a block (hereafter, referred to as a "first block") is set in accordance with a luminance level relationship with respect to a block right next to the first block (hereafter, referred to as a "second block"). If a difference obtained by subtracting the luminance of the second block from the luminance of the first block is greater than a first threshold, the feature amount code of the first block is "1". If a difference obtained by subtracting the luminance of the second block from the luminance of the first block is less than or equal to the first threshold and greater than a second threshold, the feature amount code of the first block is "2". If a difference obtained by subtracting the luminance of the second block from the luminance of the first block is less than or equal to the second threshold, the feature amount code of the first block is "3". In such a way, the feature amount code has at least three types of values.

Further, when the first block or the second block is covered by an eyelash, an eyelid, or the like and is unable to be used for calculation of a feature amount, the feature amount code may be "4". In such a case, the feature amount code has four types of values. In the following description, the feature amount code has the four types described above.

Figure 11G:
FIG. 11G is a schematic diagram illustrating an overview of the iris recognition process in the first example embodiment.

FIG. 11G illustrates a feature amount image in which a feature amount code is depicted at a position of each block.

In the feature amount image of FIG. 11G, values "1", "2", "3", and "4" of the feature amount code are represented by different patterns, respectively. For example, this representation may be such that the image pattern such as color, brightness, a pattern, or the like is changed in accordance with a code value. The extracted feature amount or feature amount image is stored in the storage unit 67.

Note that, although the example described above illustrates the positional relationship that the second block is located right next to the first block, the second block may be located left next to the first block, and in more general, the positional relationship may be such that that the second block is adjacent to the first block.

In step S206, the matching unit 66 performs a process of matching the feature amount calculated in step S205 with a pre-registered feature amount. In this process, the feature amount calculated in step S205 is compared with the pre-registered feature amount to determine a region where the feature amounts are matched (matched region), a region where the feature amounts are not matched (unmatched region), or a region where matching is unable to be performed (matching disabled region). For example, a region where both the codes of compared targets are "1" or "3" may be determined as a matched region. A region where one of the codes of compared targets is "1" and the other is "3" may be determined as an unmatched region. A region where any of the codes of compared targets is "4" is unable to be used for matching and thus may be determined as a matching disabled region. When a matching degree score calculated from a size or the like of the matched region and the unmatched region exceeds a predetermined threshold, two iris images corresponding to two feature amounts to be compared are determined to be of the same person. Information on a matching result and a matched region, an unmatched region, and a matching disabled region is stored in the storage unit 67. Note that information on a feature amount, a matched region, an unmatched region, and a matching disabled region may be more generally referred to as matching information regarding iris recognition. In step S207, the matching unit 66 outputs the matching result in step S206 to the information processing device 10 and ends the process.

As described above, the iris recognition system 1 in the present example embodiment can call for attention to a recognition target by using a notification method of a voice, a screen display, or the like when the visual line direction of the recognition target is out of the capturing direction of the iris capturing camera 30 over a predetermined threshold. Thus, even when the recognition target is not in a stationary state, an iris image can be efficiently captured in a walk-through. As a result, it is possible to reduce time required for iris authentication.

Further, the iris recognition system 1 in the present example embodiment can switch a method of estimating a visual line direction between a case where the recognition target is present at a position distant from the iris capturing camera 30 and a case where the recognition target is present at a position close to the iris capturing camera 30. Accordingly, the iris recognition system 1 can select a suitable estimation method in accordance with the distance.

Second Example Embodiment

An iris recognition system 2 in a second example embodiment will be described below. Note that a reference common to the reference provided in the drawings in the first example embodiment denotes the same object. Description of a part common to the first example embodiment will be omitted, and different features will be described in detail.

Figure 12:
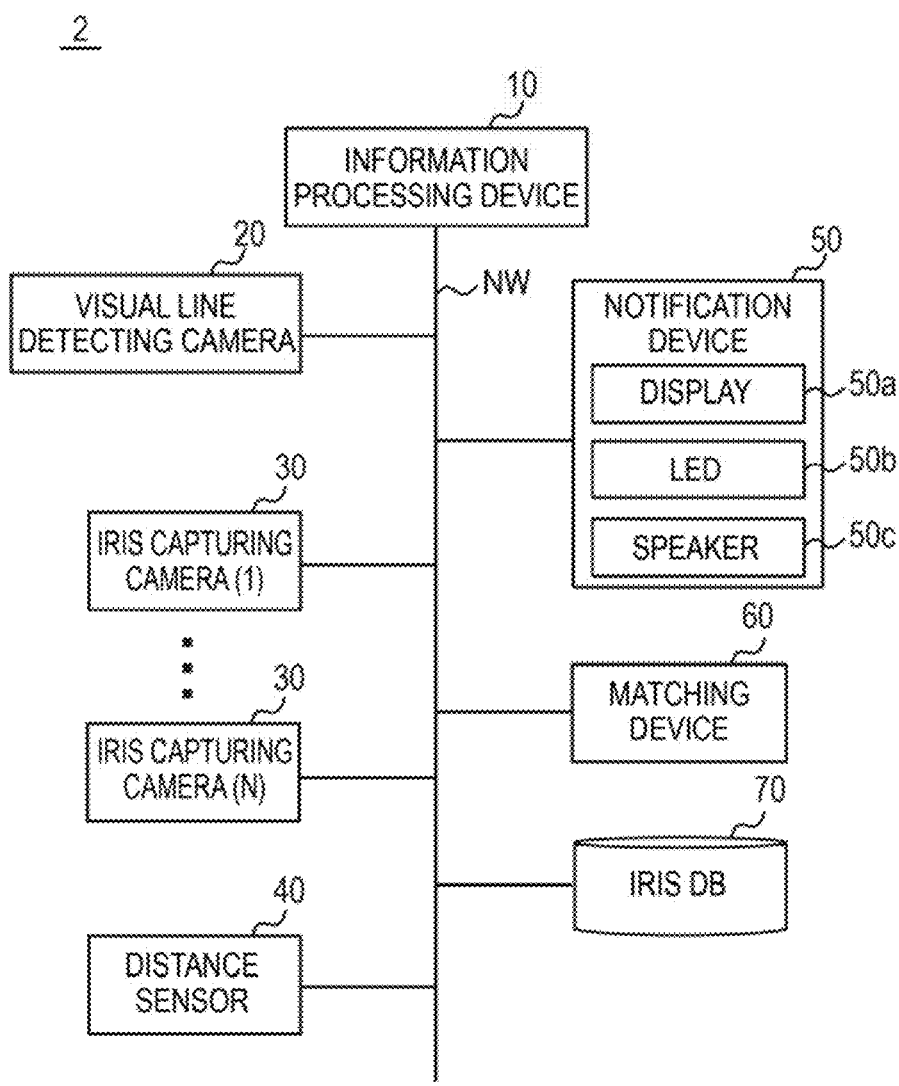
FIG. 12 is a diagram illustrating an example of an overall configuration of an iris recognition system in a second example embodiment.

FIG. 12 is a diagram illustrating an example of the overall configuration of the iris recognition system 2 in the present example embodiment. As illustrated in FIG. 12, the iris recognition system 2 in the present example embodiment has a plurality of iris capturing cameras 30 (N≥2) instead of one iris capturing camera 30.

Figure 13:
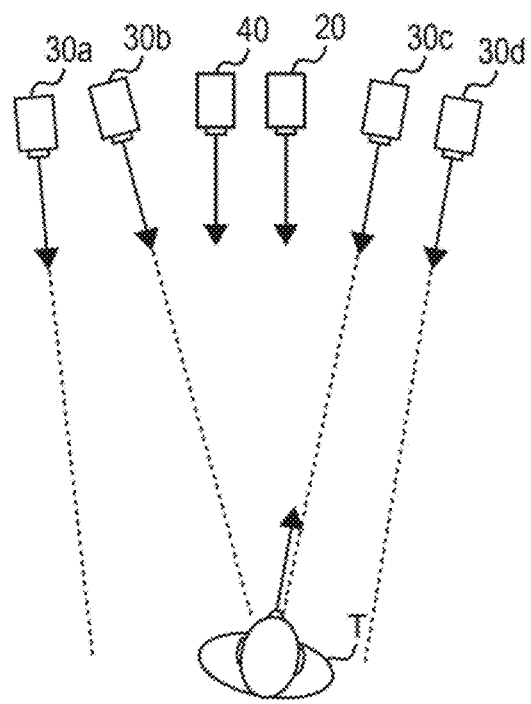
FIG. 13 is a diagram illustrating an angle of a visual line direction of the recognition target relative to capturing directions of iris capturing cameras in the second example embodiment.

FIG. 13 is a diagram illustrating the angle of the visual line direction of a recognition target in the present example embodiment relative to the capturing directions of a plurality of iris capturing cameras 30. Herein, four iris capturing cameras 30 (30a to 30d) have different capturing directions, respectively. The angle between the capturing direction of the iris capturing camera 30c of the four iris capturing cameras 30 and the visual line direction of the recognition target is the minimum. In such a case, the information processing device 10 (the control unit 14) in the present example embodiment outputs control information to the iris capturing camera 30c so as to cause the iris capturing camera 30c, which is selected based on the detected angle out of the plurality of iris capturing cameras 30 having different capturing directions from each other, to capture an iris image.

Figure 14:
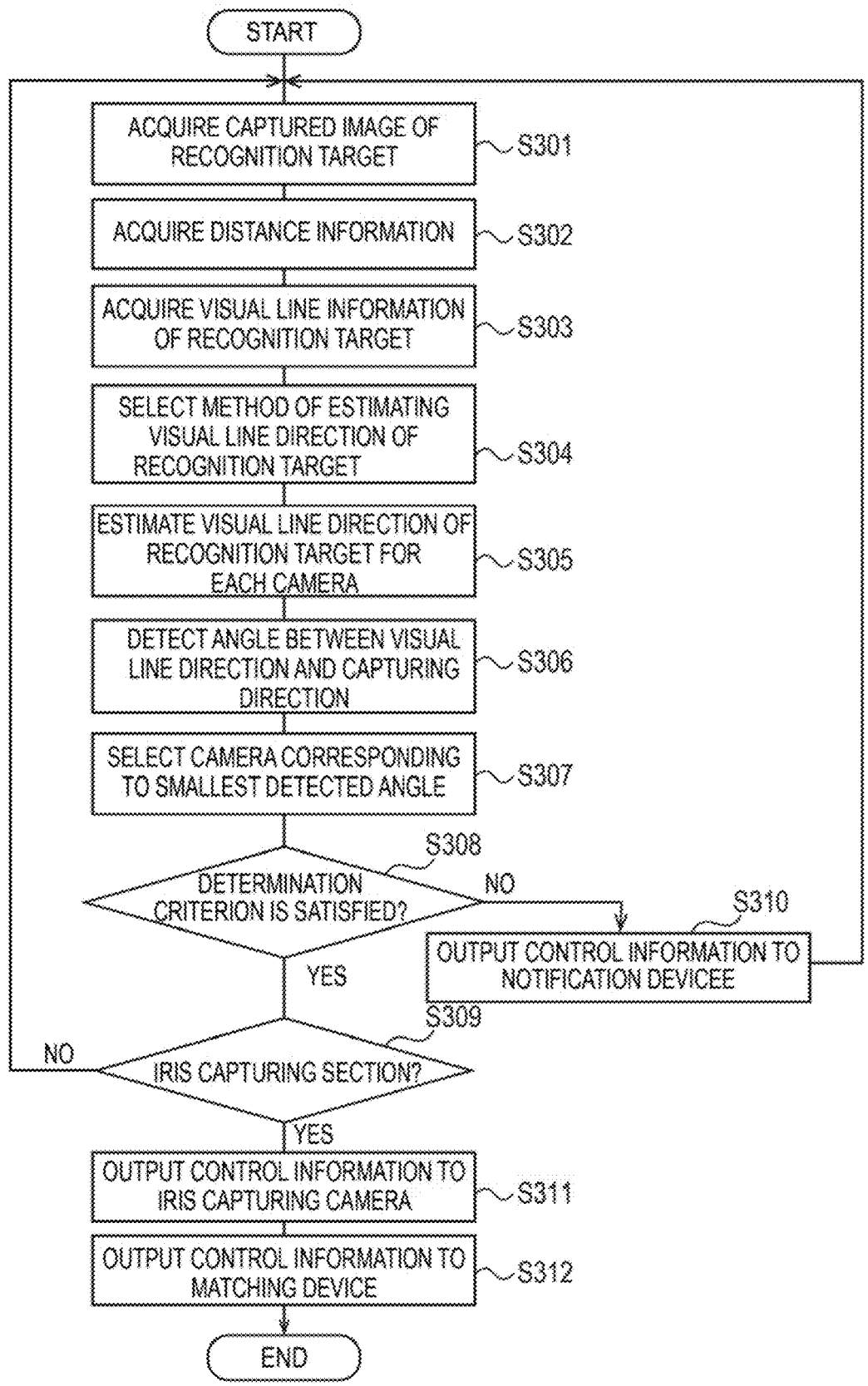
FIG. 14 is a flowchart illustrating one example of a process in an information processing device in the second example embodiment.

FIG. 14 is a flowchart illustrating one example of a control process of the information processing device 10 in the present example embodiment. Note that the process of FIG. 14 is an example, and order in the process can be changed as appropriate.

First, the image acquisition unit 11 receives a captured image captured by the visual line detecting camera 20 (step S301). Note that the captured image is used for estimation of a visual line direction and thus includes at least a part of a face of a recognition target.

Next, the distance information acquisition unit 13 receives, from the distance sensor 40, a signal indicating the distance between the recognition target and the iris capturing camera 30 as distance information (step S302).

Next, the visual line information acquisition unit 12 analyzes the captured image received in step S301 and acquires visual line information on a recognition target (step S303). Note that the visual line information in the present example embodiment may include a face orientation of a recognition target, position information on an eye region within an image, position information on an outer canthus, a pupil, and an iris, or the like.

Next, the control unit 14 (the visual line direction estimation unit 14a) selects a method of estimating a visual line direction of the recognition target based on the distance between the recognition target and the iris capturing camera 30 (step S304). Specifically, the control unit 14 (the visual line direction estimation unit 14a) estimates a visual line direction based on the face orientation of a recognition target included in visual line information when the distance is greater than or equal to a predetermined reference distance. Alternatively, the control unit 14 (the visual line direction estimation unit 14a) estimates a visual line direction based on the position information on a pupil or an iris of a recognition target included in visual line information when the distance is less than a reference distance.

Next, the control unit 14 (the visual line direction estimation unit 14a) estimates the visual line direction of the recognition target from visual line information for each of the plurality of iris capturing cameras 30 based on a selected estimation method (step S305). That is, the control unit 14 (the visual line direction estimation unit 14a) estimates N visual line directions when N iris capturing cameras 30 are installed.

Next, the control unit 14 (the angle detection unit 14*b*) detects the plurality of angles between the visual line direction estimated in step S305 and the capturing directions of the iris capturing cameras 30, respectively (step S306).

Next, the control unit 14 (the determination unit 14*c*) selects the iris capturing camera 30 corresponding to the smallest detected angle out of the plurality of iris capturing cameras 30 (step S307).

Next, the control unit 14 (the determination unit 14*c*) determines whether or not the detected angle satisfies a predetermined determination criterion (step S308). In this step, if the control unit 14 (the determination unit 14*c*) determines that the detected angle satisfies the predetermined determination criterion (step S308: YES), the process proceeds to step S309. On the other hand, if the control unit 14 (the determination unit 14*c*) determines that the detected angle does not satisfy the predetermined determination criterion (step S309: NO), the process proceeds to step S310.

In step S309, the control unit 14 (the determination unit 14*c*) determines whether or not the recognition target is present inside the iris capturing section. In this step, if the control unit 14 (the determination unit 14*c*) determines that the recognition target is present inside the iris capturing section (step S309: YES), the process proceeds to step S311. On the other hand, if the control unit 14 (the determination unit 14*c*) determines that the recognition target is not present inside the iris capturing section (step S309: NO), the process returns to step S301.

In step S310, the control unit 14 (the notification control unit 14*d*) generates notification control information used for notifying the recognition target of information based on an angle and controls the notification device 50, and the process then returns to step S301. That is, the control unit 14 (the notification control unit 14*d*) determines a notification method performed by the notification device 50 and calls for attention to the recognition target to direct the visual line direction to the iris capturing camera 30 side corresponding to the smallest detected angle by using a notification method with screen display, a sound, a light, or the like at the notification device 50. As an example of notification in the present example embodiment may be, for example, a method of displaying a message such as "please look at the LED-ON camera", "please look at camera No. 3", or the like on the display 50*a*.

In step S311, the control unit 14 (the drive control unit 14*e*) outputs control information to the iris capturing camera. That is, the control unit 14 (the drive control unit 14*e*) causes the iris capturing camera 30 to capture an iris image when the angle is less than or equal to a predetermined angle and the distance is less than or equal to a predetermined distance.

The control unit 14 (the drive control unit 14*e*) then outputs control information to the matching device 60 (step S312), performs a matching process of the iris image captured by the iris capturing camera with a registered iris image pre-registered in the iris database 70, and ends the process.

As described above, the iris recognition system 2 in the present example embodiment selects the iris capturing camera 30 which actually captures an iris image based on the detected angle out of the plurality of iris capturing cameras 30 having different capturing directions from each other. Since the iris capturing camera 30 corresponding to the capturing direction close to the visual line direction of a recognition target is selected, the recognition target more easily adjusts the visual line direction than in the case of the first example embodiment. Accordingly, a recognition target's convenience at iris authentication can be further improved.

Third Example Embodiment

An iris recognition system in a third example embodiment will be described below. Note that a reference common to the reference provided in the drawings in the example embodiments described above denotes the same object. Description of a part common to the example embodiments described above will be omitted, and different features will be described in detail.

In the example embodiments described above, illustration has been provided assuming that the determination criterion value for a detected angle is constant regardless of the distance to a recognition target. On the other hand, the present example embodiment is different from the first and second example embodiments in that the control unit 14 (the determination unit 14*c*) changes the determination criterion value used for control of causing the visual line direction of a recognition target and the capturing direction of the iris capturing camera 30 to face each other (control of reducing the detected angle) based on a detected distance.

Figure 15:
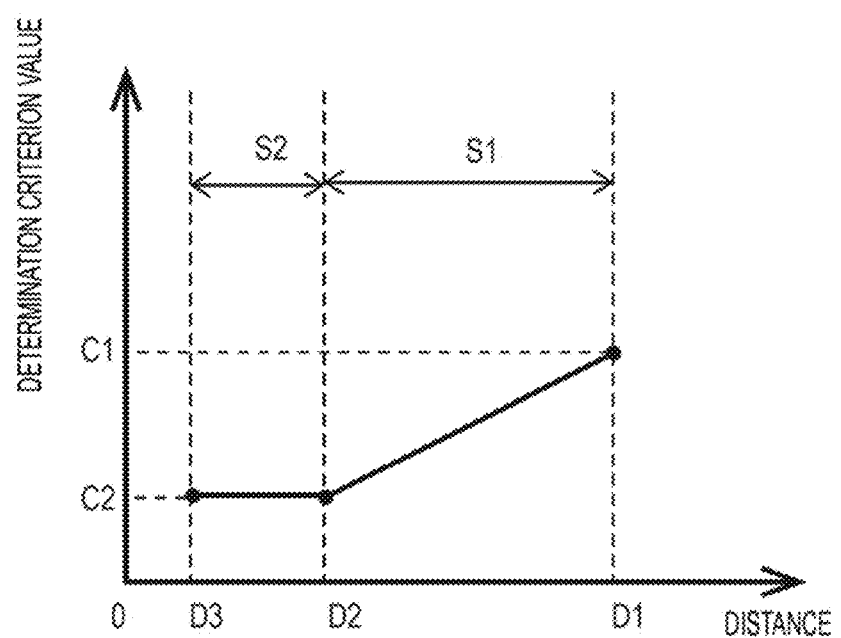
FIG. 15 is a graph illustrating a relationship between a distance between an iris capturing camera and a recognition target and a determination criterion value of a detected angle in a third example embodiment.

FIG. 15 is a graph illustrating a relationship between the distance between the iris capturing camera 30 and a recognition target and the determination criterion value for a detected angle in the present example embodiment. Here, one example of a relationship between the distance and the determination criterion value is illustrated, where the horizontal axis represents the distance between the iris capturing camera 30 and the recognition target and the vertical axis represents the determination criterion value in accordance with the distance. The section of distance D1 to D2 indicates the visual line adjustment section S1. Further, the section of distance D3 to D2 indicates the iris capturing section S2. Note that, when the distance is shorter than D3 or when the distance is longer than D1, since iris capturing and visual line detection are not performed, no determination criterion value is defined. The example of FIG. 15 illustrates that, as the recognition target approaches the camera inside the visual line adjustment section S1, the determination criterion value decreases from C1 to C2. Further, in the iris capturing section S2, the determination criterion value is constant at C2.

Figure 16:
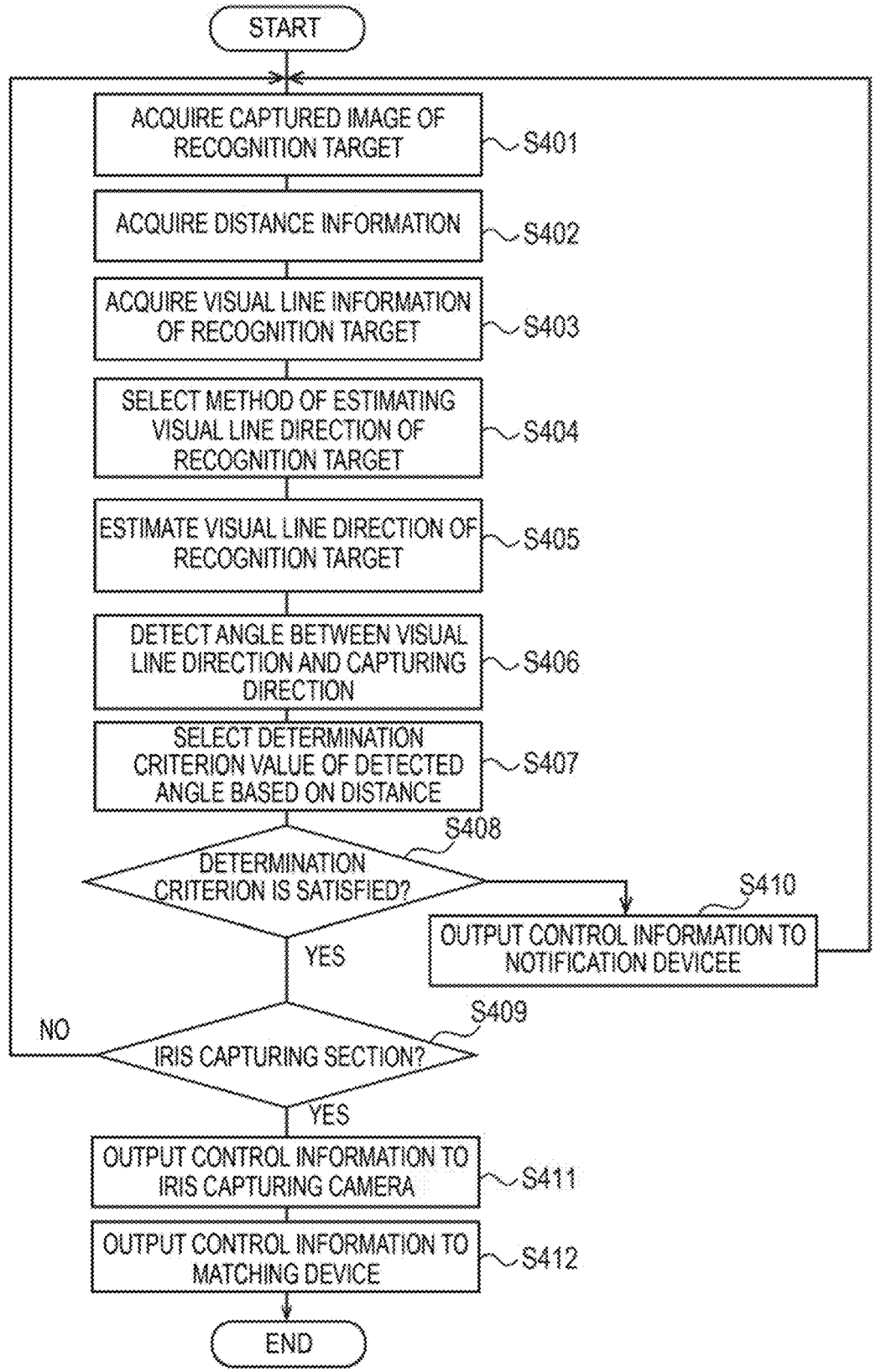
FIG. 16 is a flowchart illustrating one example of a process in an information processing device in the third example embodiment.

FIG. 16 is a flowchart illustrating one example of a control process of the information processing device 10 in the present example embodiment. Note that the process of FIG. 16 is an example, and order in the process may be changed as appropriate.

First, the image acquisition unit 11 receives a captured image captured by the visual line detecting camera 20 (step S401). Note that the captured image is used for estimation of a visual line direction and thus includes at least a part of a face of a recognition target.

Next, the distance information acquisition unit 13 receives, from the distance sensor 40, a signal indicating the distance between the recognition target and the iris capturing camera 30 as distance information (step S402).

Next, the visual line information acquisition unit 12 analyzes the captured image received in step S401 and acquires visual line information on a recognition target (step S403). Note that the visual line information in the present example embodiment may include a face orientation of a recognition target, position information on an eye region within an image, position information on an outer canthus, a pupil, and an iris, or the like.

Next, the control unit 14 (the visual line direction estimation unit 14a) selects a method of estimating a visual line direction of the recognition target based on the distance between the recognition target and the iris capturing camera 30 (step S404). Specifically, the control unit 14 (the visual line direction estimation unit 14a) of the present example embodiment estimates a visual line direction based on the face orientation of a recognition target included in visual line information when the distance is greater than or equal to a predetermined reference distance. Alternatively, the control unit 14 (the visual line direction estimation unit 14a) estimates a visual line direction based on the position information on a pupil or an iris of a recognition target included in visual line information when the distance is less than a reference distance.

Next, the control unit 14 (the visual line direction estimation unit 14a) estimates the visual line direction of the recognition target from visual line information based on a selected estimation method (step S405). Note that the control unit 14 (the visual line direction estimation unit 14a) estimates N visual line directions when N iris capturing cameras 30 are installed.

Next, the control unit 14 (the angle detection unit 14b) detects the angle between the visual line direction estimated in step S405 and the capturing direction of the iris capturing camera 30 (step S406).

Next, the control unit 14 (the determination unit 14c) selects a determination criterion value of the detected angle based on the detected distance (step S407).

Next, the control unit 14 (the determination unit 14c) determines whether or not the detected angle satisfies a predetermined determination criterion (step S408). In this step, if the control unit 14 (the determination unit 14c) determines that the detected angle satisfies the predetermined determination criterion (step S408: YES), the process proceeds to step S409. On the other hand, if the control unit 14 (the determination unit 14c) determines that the detected angle does not satisfy the predetermined determination criterion (step S409: NO), the process proceeds to step S410.

In step S409, the control unit 14 (the determination unit 14c) determines whether or not the recognition target is present inside the iris capturing section. In this step, if the control unit 14 (the determination unit 14c) determines that the recognition target is present inside the iris capturing section (step S409: YES), the process proceeds to step S411. On the other hand, if the control unit 14 (the determination unit 14c) determines that the recognition target is not present inside the iris capturing section (step S409: NO), the process returns to step S401.

In step S410, the control unit 14 (the notification control unit 14d) generates notification control information used for notifying the recognition target of information based on the angle and controls the notification device 50, and the process then returns to step S401. That is, the control unit 14 (the notification control unit 14d) determines a notification method performed by the notification device 50 and calls for attention to the recognition target to direct the visual line direction to the iris capturing camera 30 side by using a notification method with screen display, a sound, a light, or the like at the notification device 50.

In step S411, the control unit 14 (the drive control unit 14e) outputs control information to the iris capturing camera. That is, the control unit 14 (the drive control unit 14e) causes the iris capturing camera 30 to capture an iris image when the angle is less than or equal to a predetermined angle and the distance is less than or equal to a predetermined distance.

The control unit 14 (the drive control unit 14e) then outputs control information to the matching device 60 (step S412), performs a matching process of the iris image captured by the iris capturing camera with a registered iris image pre-registered in the iris database 70, and ends the process.

As described above, the iris recognition system in the present example embodiment can change the determination criterion value used for determining propriety of the angle, that is, a displacement between the visual line direction of a recognition target and the capturing direction of the iris capturing camera 30 in accordance with the distance. Thus, by defining the determination criterion value to be lenient at a position where accuracy is not required and defining the determination criterion value to be strict at a position where accuracy is required, it is possible to adjust the visual line direction more efficiently and capture an iris image at high accuracy.

Fourth Example Embodiment

Figure 17:
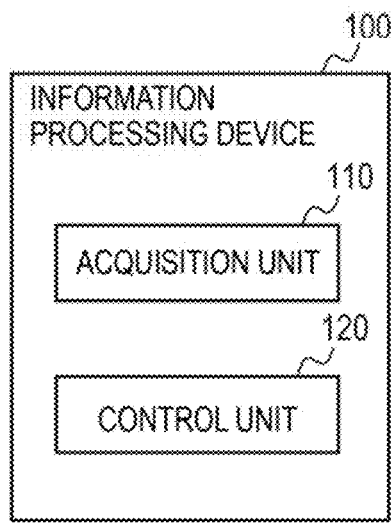
FIG. 17 is a block diagram illustrating a function of an information processing device in a fourth example embodiment.

FIG. 17 is a block diagram illustrating the function of an information processing device 100 in the present example embodiment. The information processing device 100 is an information processing device that controls the iris recognition system and has an acquisition unit 110 that acquires visual line information on a recognition target from an image captured by a first capture device and a control unit 120 that controls the iris recognition system so that a visual line direction obtained from the visual line information and a capturing direction of a second capture device that captures an iris image used for iris recognition of the recognition target face each other. According to the information processing device 100 in the present example embodiment, user convenience in iris authentication can be improved.

Fifth Example Embodiment

Figure 18:
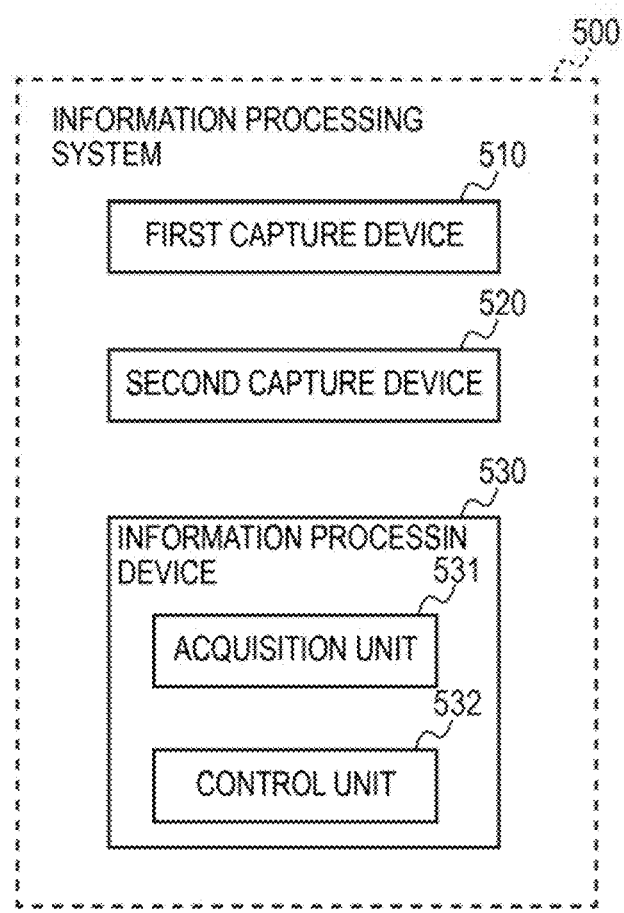
FIG. 18 is a block diagram illustrating a function of an information processing system in a fifth example embodiment.

FIG. 18 is a block diagram illustrating the function of an information processing system 500 in the present example embodiment. The information processing system 500 has a first capture device 510 that captures a first image including at least a part of a face of a recognition target, a second capture device 520 that captures a second image including an iris of the recognition target, and an information processing device 530. The information processing device 530 has an acquisition unit 531 that acquires visual line information on the recognition target based on the first image and a control unit 532 that controls the information processing system 500 so that a visual line direction of the recognition target obtained from the visual line information and a capturing direction of the second capture device face each other. According to the information processing system 500 in the present example embodiment, user convenience in iris authentication can be improved.

Modified Example Embodiments

While this disclosure has been described above with reference to the example embodiment, this disclosure is not limited to the example embodiments described above. Various modifications that may be appreciated by those skilled in the art can be made to the configuration and details of this disclosure within the scope not departing from the spirit of this disclosure. For example, an example embodiment in which a part of the configuration of any of the example embodiments is added to another example embodiment or an example embodiment in which a part of the configuration of any of the example embodiments is replaced with a part of the configuration of another example embodiment should be understood as an example embodiment to which this disclosure may be applied.

The above example embodiments have been described assuming that the iris capturing camera 30 is fixed. The control unit 14 (the drive control unit 14e) may drive, based on visual line information, the iris capturing camera 30 in a direction so as to reduce the angle. In such a case, unlike the example embodiments described above, it is no longer necessary to call for attention to the recognition target. This is advantageous in that the user of a facility (the recognition target) may pass without paying attention to an authentication process.

In the second example embodiment described above, the case where an iris image is captured by a capture device where the detected angle is the smallest out of the plurality of iris capturing cameras 30 has been described. However, the control unit 14 may select an iris image based on the angle out of an iris image group captured by the plurality of iris capturing cameras 30 having different capturing directions from each other and cause the matching device 60 to perform a matching process based on the selected image. For example, the control unit 14 may select an iris image captured by the iris capturing camera 30 corresponding to the smallest detected angle out of an iris image group captured by a plurality of capture devices having different capturing directions from each other. This case is advantageous in that selection of an image is facilitated. Similarly, the control unit 14 can select an iris image captured by the iris capturing camera 30 where the angle is within a tolerance range. This is advantageous in that an image which is not captured at the smallest angle but has high quality and thus is more suitable for iris recognition can be selected.

In the example embodiments described above, the method of detecting the visual line direction of a recognition target by analyzing a captured image captured by the visual line detecting camera 20 (first capture device) (hereafter, referred to as a "first image") has been described. However, the visual line direction may be estimated based on an image captured by the iris capturing camera 30 instead of the visual line detecting camera 20 (hereafter, referred to as a "second image"). For example, the control unit 14 (the visual line direction estimation unit 14a) may estimate the visual line direction based on the first image when the distance to the recognition target is greater than or equal to a predetermined reference distance and estimate the visual line direction of the recognition target based on the second image when the distance to the recognition target is less than the predetermined reference distance. The resolution of the second image captured by the iris capturing camera 30 is higher than the resolution of the first image captured by the visual line detecting camera 20. This is advantageous in that accuracy in estimation of a visual line direction can be improved.

Although the case where the distance to a recognition target is detected by the distance sensor 40 has been described in the example embodiments described above, the method of measuring the distance is not limited thereto. The distance to a recognition target may be acquired by the visual line detecting camera 20 (first capture device). That is, visual line detection and distance detection may be performed by a single camera. For example, when an object whose distance and size are known is included in a captured image captured by the visual line detecting camera 20, it is possible to estimate the distance by comparing the size of the recognition target with the size of the object in the same image. In such a case, since the distance sensor 40 can be omitted, this is advantageous in that the hardware configuration can be simplified.

Although only the authentication process based on an iris image is performed in the example embodiments described above, another authentication method may be combined thereto. For example, the matching device 60 may perform two-factor authentication consisting of face authentication to authenticate a recognition target based on a matching result of the first image with a registered face image of a registrant and iris authentication to authenticate a recognition target based on a matching result of the second image with a registered iris image of a registrant. By performing two-factor authentication, it is possible to improve authentication accuracy.

Further, the matching device 60 may perform two-step authentication in which a recognition target authenticated as a registrant in face authentication is an authentication target in iris authentication. Since the number of recognition targets is reduced by face authentication, it is possible to improve the speed in 1:N iris image authentication.

Although the case where a notification process on a recognition target is performed in addition to a process of selecting the iris capturing camera 30 has been described in the above second example embodiment, a system configuration in which the notification process is omitted may be possible. This case is advantageous in that it is no longer necessary for the recognition target to adjust the visual line direction.

In the above example embodiments, the case where the visual line direction is represented by an angle and it is determined whether or not to capture an iris image based on the angle between the visual line direction and the capturing direction has been described. However, the visual line direction may be represented by a difference between the positions of the center of a pupil and a reflected image included in the pupil. That is, when the center of the pupil and the reflected image included in the pupil are matched, it can be determined that the visual line direction of a recognition target and the capturing direction of the iris capturing camera 30 face each other. The information processing device 10 is not necessarily required to calculate the angle as the visual line direction.

Although the case where the number of iris capturing cameras 30 used for capturing is one has been described in the above first example embodiment, one iris capturing camera used for capturing may be temporarily determined in advance out of N (N≥2) iris capturing cameras 30. In such a case, the angle between the visual line direction of a recognition target and the capturing direction of another iris capturing camera 30 may be calculated to select a suitable camera only when the angle between the visual line direction of a recognition target and the capturing direction of another iris capturing camera 30 is out of a predetermined range. Further, in the same manner as in the second example embodiment, the angle between the visual line direction and the capturing direction may be calculated for N patterns, and a camera corresponding to a capturing direction which is the closest to the visual line direction of the recognition target may be selected.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing device that controls an iris recognition system, the information processing device comprising:

an acquisition unit that acquires visual line information on a recognition target from an image captured by a first capture device; and a control unit that controls the iris recognition system so that a visual line direction obtained from the visual line information and a capturing direction of a second capture device, which captures an iris image used for iris recognition of the recognition target, face each other.

(Supplementary Note 2)

The information processing device according to supplementary note 1, wherein the control unit generates notification control information used for notifying the recognition target of information based on the visual line direction.

(Supplementary Note 3)

The information processing device according to supplementary note 2, wherein the notification control information includes information used for guiding the visual line direction to the second capture device side.

(Supplementary Note 4)

The information processing device according to any one of supplementary notes 1 to 3, wherein the control unit causes the second capture device selected based on the visual line direction out of a plurality of second capture devices having different capturing directions from each other to capture the iris image.

(Supplementary Note 5)

The information processing device according to supplementary note 4, wherein the control unit causes, out of the plurality of second capture devices having the different capturing directions from each other, the second capture device which forms the smallest angle between the visual line direction and the capturing direction to capture the iris image.

(Supplementary Note 6)

The information processing device according to any one of supplementary notes 1 to 3, wherein, based on the visual line information, the control unit drives the second capture device in a direction in which an angle between the visual line direction and the capturing direction is reduced.

(Supplementary Note 7)

The information processing device according to any one of supplementary notes 1 to 3, wherein the control unit selects the iris image based on an angle between the visual line direction and the capturing direction out of an iris image group captured by a plurality of second capture devices having different capturing directions from each other.

(Supplementary Note 8)

The information processing device according to supplementary note 7, wherein the control unit selects the iris image in which an angle between the visual line direction and the capturing direction is the smallest out of an iris image group captured by the plurality of second capture devices having the different capturing directions from each other.

(Supplementary Note 9)

The information processing device according to any one of supplementary notes 1 to 8 further comprising a distance information acquisition unit that acquires a distance to the recognition target, wherein, based on the distance, the control unit changes a determination criterion used for control of causing the visual line direction and the capturing direction to face each other.

(Supplementary Note 10)

The information processing device according to any one of supplementary notes 1 to 8 further comprising a distance information acquisition unit that acquires a distance to the recognition target, wherein the control unit causes the second capture device to capture the iris image when the visual line direction is included in a predetermined range and when the distance is less than or equal to a predetermined distance.

(Supplementary Note 11)

The information processing device according to any one of supplementary notes 1 to 8 further comprising a distance information acquisition unit that acquires a distance to the recognition target, wherein the control unit estimates the visual line direction based on a face orientation of the recognition target included in the visual line information when the distance is greater than or equal to a predetermined reference distance and estimates the visual line direction based on position information on a pupil or an iris of the recognition target included in the visual line information when the distance is less than the reference distance.

(Supplementary Note 12)

The information processing device according to any one of supplementary notes 1 to 10, wherein the control unit estimates the visual line direction based on position information on a pupil or an iris of the recognition target included in the visual line information.

(Supplementary Note 13)

An information processing system comprising:

a first capture device that captures a first image including at least a part of a face of a recognition target;

a second capture device that captures a second image including an iris of the recognition target; and an information processing device, wherein the information processing device comprises an acquisition unit that acquires visual line information on the recognition target based on the first image, and a control unit that controls the information processing system so that a visual line direction of the recognition target obtained from the visual line information and a capturing direction of the second capture device face each other.

(Supplementary Note 14)

The information processing system according to supplementary note 13, wherein resolution of the second image is higher than resolution of the first image.

(Supplementary Note 15)

The information processing system according to supplementary note 14, wherein a capturing wavelength in the second capture device is different from a capturing wavelength in the first capture device.

(Supplementary Note 16)

The information processing system according to any one of supplementary notes 13 to 15, wherein the control unit estimates the visual line direction based on the first image when a distance to the recognition target is greater than or equal to a predetermined reference distance and estimates the visual line direction of the recognition target based on the second image when the distance is less than the predetermined reference distance.

(Supplementary Note 17)

The information processing system according to supplementary note 16 further comprising a distance sensor that detects the distance and outputs the distance to the information processing device.

(Supplementary Note 18)

The information processing system according to supplementary note 17, wherein the distance is acquired by the first capture device.

(Supplementary Note 19)

The information processing system according to any one of supplementary notes 13 to 18 further comprising a matching device that performs face authentication to authenticate the recognition target based on a matching result between the first image and a registered face image of a registrant and iris authentication to authenticate the recognition target based on a matching result between the second image and a registered iris image of the registrant.

(Supplementary Note 20)

The information processing system according to supplementary note 19, wherein the matching device identifies, as an authentication target in the iris authentication, the recognition target authenticated as the registrant in the face authentication.

(Supplementary Note 21)

An information processing method for controlling an iris recognition system, the information processing method comprising:
  acquiring visual line information on a recognition target from an image captured by a first capture device; and
  controlling the iris recognition system so that a visual line direction obtained from the visual line information and a capturing direction of a second capture device, which captures an iris image used for iris recognition of the recognition target, face each other.

(Supplementary Note 22)

A storage medium storing a program that causes a computer that controls an iris recognition system to perform:
  acquiring visual line information on a recognition target from an image captured by a first capture device; and
  controlling the iris recognition system so that a visual line direction obtained from the visual line information and a capturing direction of a second capture device, which captures an iris image used for iris recognition of the recognition target, face each other.

REFERENCE SIGNS LIST

NW network
1,2 iris recognition system
10 information processing device
11 image acquisition unit
12 visual line information acquisition unit
13 distance information acquisition unit
14 control unit
14*a* visual line direction estimation unit
14*b* angle measurement unit
14*c* determination unit
14*d* notification control unit
14*e* drive control unit
15 storage unit
20 visual line determining camera (first capture device)
30 iris capturing camera (second capture device)
40 distance sensor
50 notification device
50*a* display
50*b* LED
50*c* speaker
60 matching device
61 image acquisition unit
62 iris image extraction unit
63 coordinate conversion unit
64 block division unit
65 feature amount calculation unit
66 matching unit
67 storage unit
70 iris database
100 information processing device
110 acquisition unit
120 control unit
151, 651 CPU
152, 652 RAM
153, 653 ROM
154, 654 HDD
155, 655 communication I/F
156 display device
157 input device
158, 658 bus
500 information processing system
510 first capture device
520 second capture device
530 information processing device
531 acquisition unit
532 control unit

What is claimed is:

1. An information processing device that controls an iris recognition system, the information processing device comprising:
  at least one processor; and
  at least one memory storing instructions executable by the processor to:
  acquire visual line information on a recognition target from an image captured by a first capture device;
  acquire a distance between a second capture device and the recognition target, wherein the second capture device captures an iris image used for iris recognition of the recognition target;
  change, based on the distance, a determination criterion used for controlling the iris recognition system so that a visual line direction obtained from the visual line information and a capturing direction of the second capture device face each other, wherein the determination criterion is an angle range; and control the iris recognition system so that the visual line direction and the capturing direction of the second capture device face each other when an angle between the visual line direction and the capturing direction of the second capture device is outside the determination criteria as has been changed, wherein when the distance between the recognition target and the second capture device is a first distance, the determination criterion is changed to a first determination criterion and the iris recognition system is controlled in accordance with the first determination criterion so that the capturing direction of the second capture device and the visual line direction face each other, wherein the first determination criterion is set so that the angle range is narrower as the first distance is shorter, and when the distance between the recognition target and the second capture device is a second distance shorter than the first distance, the determination criterion is changed to a second determination criterion in which the angle range is narrower than the first determination criterion and the iris recognition system is controlled in accordance with the second determination criterion so that the capturing direction of the second capture device and the visual line direction face each other.

2. The information processing device according to claim 1, wherein the instructions are executable by the at least one processor to further generate notification control information used for notifying the recognition target of information based on the visual line direction.

3. The information processing device according to claim 2, wherein the notification control information includes information used for guiding the visual line direction to the second capture device side.

4. The information processing device according to claim 1, wherein the instructions are executable by the at least one processor to further cause the second capture device selected based on the visual line direction from among a plurality of second capture devices having different capturing directions to capture the iris image.

5. The information processing device according to claim 4, wherein, from among the plurality of second capture devices having the different capturing directions from each other, the second capture device having a smallest angle between the visual line direction and the capturing direction is selected to capture the iris image.

6. The information processing device according to claim 1, wherein the instructions are executable by the at least one processor to further, based on the visual line information, drive the second capture device in a direction in which the angle between the visual line direction and the capturing direction is reduced.

7. The information processing device according to claim 1, wherein the instructions are executable by the at least one processor to further select the iris image based on the angle between the visual line direction and the capturing direction from among an iris image group captured by a plurality of second capture devices having different capturing directions.

8. The information processing device according to claim 7, wherein the iris image in which the angle between the visual line direction and the capturing direction is smallest from among the iris image group captured by the plurality of second capture devices having the different capturing directions is selected.

9. The information processing device according to claim 1, wherein the instructions are executable by the at least one processor to further cause the second capture device to capture the iris image when the visual line direction is included in a predetermined range and when the distance is less than or equal to a predetermined distance.

10. The information processing device according to claim 1, wherein the instructions are executable by the at least one processor to further estimate the visual line direction based on a face orientation of the recognition target included in the visual line information when the distance is greater than or equal to a predetermined reference distance and estimate the visual line direction based on position information on a pupil or an iris of the recognition target included in the visual line information when the distance is less than the reference distance.

11. The information processing device according to claim 1, wherein the instructions are executable by the at least one processor to further estimate the visual line direction based on position information on a pupil or an iris of the recognition target included in the visual line information.

12. An information processing system comprising:
a first capture device that captures a first image including at least a part of a face of a recognition target;
a second capture device that captures a second image including an iris of the recognition target; and
an information processing device,
wherein the information processing device comprises:
at least one processor; and
at least one memory storing instructions executable by the processor to:
acquire visual line information on the recognition target based on the first image;
acquire a distance between a second capture device and the recognition target, wherein the second capture device captures an iris image used for iris recognition of the recognition target;
change, based on the distance, a determination criterion used for controlling the iris recognition system so that a visual line direction obtained from the visual line information and a capturing direction of the second capture device face each other, wherein the determination criterion is an angle range; and
control the iris recognition system so that the visual line direction and the capturing direction of the second capture device face each other when an angle between the visual line direction and the capturing direction of the second capture device is outside the determination criteria as has been changed, wherein when the distance between the recognition target and the second capture device is a first distance, the determination criterion is changed to a first determination criterion and the iris recognition system is controlled in accordance with the first determination criterion so that the capturing direction of the second capture device and the visual line direction face each other, wherein the first determination criterion is set so that the angle range is narrower as the first distance is shorter, and when the distance between the recognition target and the second capture device is a second distance shorter than the first distance, the determination criterion is changed to a second determination criterion in which the angle range is narrower than the first determination criterion and the iris recognition system is controlled in accordance with the second determination criterion so that the capturing direction of the second capture device and the visual line direction face each other.

13. The information processing system according to claim 12, wherein a resolution of the second image is higher than a resolution of the first image.

14. The information processing system according to claim 13, wherein a capturing wavelength in the second capture device is different from a capturing wavelength in the first capture device.

15. The information processing system according to claim 12, wherein the instructions are executable by the at least one processor to further estimate the visual line direction based on the first image when the distance between the second capture device and the recognition target is greater than or equal to a predetermined reference distance and estimate the visual line direction of the recognition target based on the second image when the distance is less than the predetermined reference distance.

16. The information processing system according to claim 15, further comprising a distance sensor that detects the distance and outputs the distance to the information processing device.

17. The information processing system according to claim 16, wherein the distance is acquired by the first capture device.

18. The information processing system according to claim 12, further comprising a matching device that performs face authentication to authenticate the recognition target based on a matching result between the first image and a registered face image of a registrant and iris authentication to authenticate the recognition target based on a matching result between the second image and a registered iris image of the registrant.

19. An information processing method for controlling an iris recognition system, the information processing method comprising:

acquiring, by a processor, visual line information on a recognition target from an image captured by a first capture device;

acquiring, by the processor, a distance between a second capture device and the recognition target, wherein the second capture device captures an iris image used for iris recognition of the recognition target;

changing, by the processor and based on the distance, a determination criterion used for controlling the iris recognition system so that a visual line direction obtained from the visual line information and a capturing direction of the second capture device face each other, wherein the determination criterion is an angle range; and controlling, by the processor, the iris recognition system so that the visual line direction and the capturing direction of the second capture device face each other when an angle between the visual line direction and the capturing direction of the second capture device is outside the determination criteria as has been changed, wherein when the distance between the recognition target and the second capture device is a first distance, the determination criterion is changed to a first determination criterion and the iris recognition system is controlled in accordance with the first determination criterion so that the capturing direction of the second capture device and the visual line direction face each other, wherein the first determination criterion is set so that the angle range is narrower as the first distance is shorter, and when the distance between the recognition target and the second capture device is a second distance shorter than the first distance, the determination criterion is changed to a second determination criterion in which the angle range is narrower than the first determination criterion and the iris recognition system is controlled in accordance with the second determination criterion so that the capturing direction of the second capture device and the visual line direction face each other.

* * * * *